United States Patent [19]
Bhagat et al.

[11] Patent Number: 5,910,981
[45] Date of Patent: Jun. 8, 1999

[54] AUTOMATIC UPDATING OF A LOCAL DATABASE SUPPORTING LOCAL NUMBER PORTABILITY

[75] Inventors: Promod Kumar Bhagat, Morganville, N.J.; Dana Lee Garoutte, Wheaton, Ill.

[73] Assignees: Lucent Technologies Inc., Murray Hill; AT&T Corp., Middletown, both of N.J.

[21] Appl. No.: 08/824,786

[22] Filed: Mar. 26, 1997

[51] Int. Cl.⁶ .............................. H04M 7/00; H04M 3/42
[52] U.S. Cl. ...................... 379/219; 379/207; 379/220; 379/230
[58] Field of Search .................................. 379/127, 207, 379/210, 211, 219, 220, 221, 229, 230, 272

[56] References Cited

U.S. PATENT DOCUMENTS

| | | | |
|---|---|---|---|
| 5,454,034 | 9/1995 | Martin | 379/272 X |
| 5,661,792 | 8/1997 | Akinpelu et al. | 379/207 X |
| 5,740,239 | 4/1998 | Bhagat et al. | 379/207 X |
| 5,771,284 | 6/1998 | Sonnenberg | 379/207 X |
| 5,854,836 | 12/1998 | Nimmagadda | 379/207 |

*Primary Examiner*—Harry S. Hong

[57] ABSTRACT

In accordance with the teachings of a prior application, in a telecommunications network, a local database stores destination telephone number information derived from a more global database, shared by a plurality of switching systems usually remote from all or most of the systems. One or more bit maps are used to store key indicators for each telephone number for which information may be required. This invention relates to a method and apparatus for automatically updating the local database, by recognizing that a switch identified as serving a directory number does not have access to the line corresponding to that number; when this condition is discovered, the global database is increased and the local database updated.

16 Claims, 19 Drawing Sheets

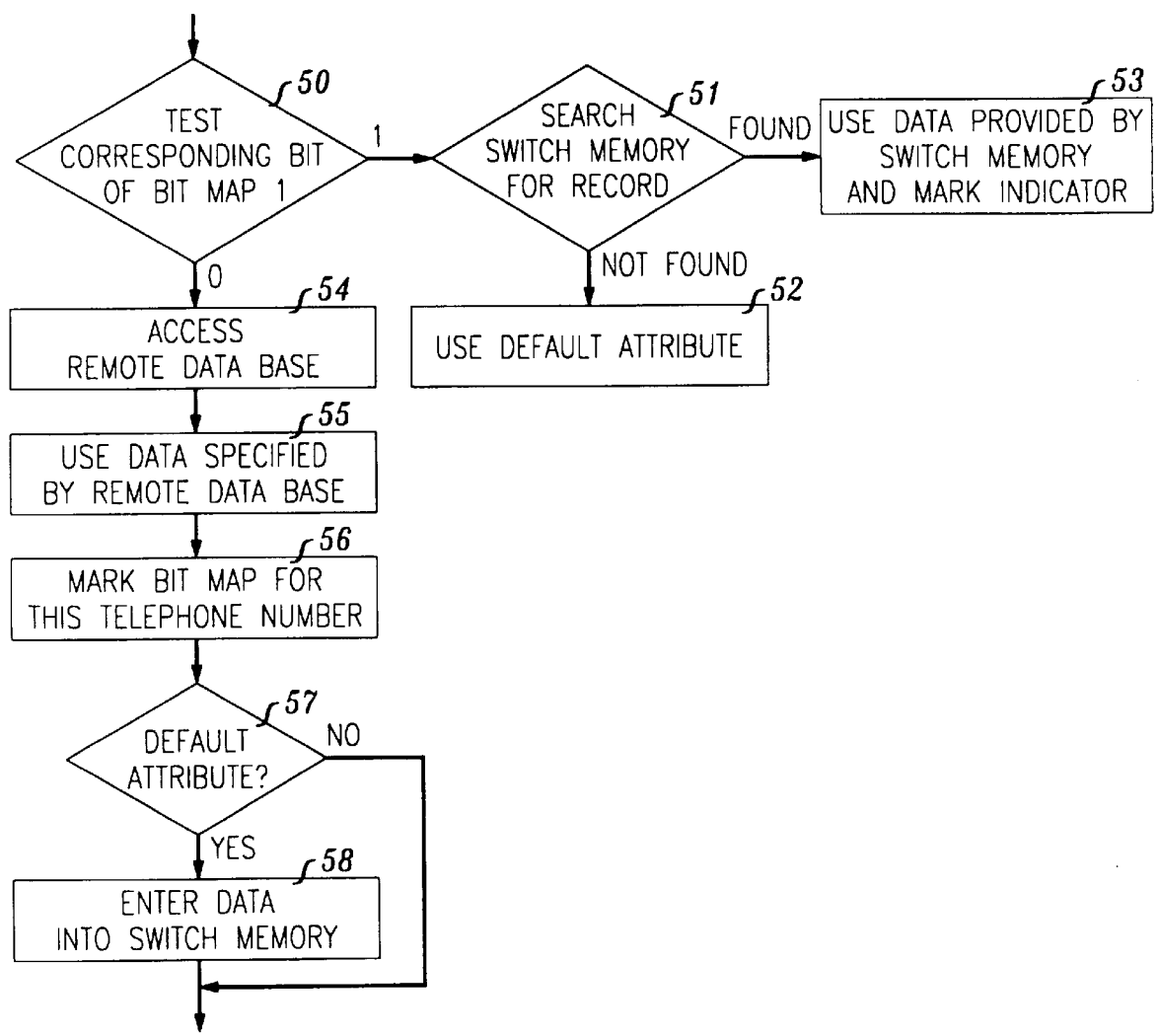

5,910,981

AUTOMATIC UPDATING OF A LOCAL DATABASE SUPPORTING LOCAL NUMBER PORTABILITY

RELATED APPLICATION

This application is related to "Improved Data Access for Telecommunication Networks," filed by the inventors of this application on Sep. 27, 1995, Ser. No. 08/534,534.

TECHNICAL FIELD

This invention relates to methods and apparatus for accessing data in telecommunications networks and specifically for accessing data in connection with the establishment of telecommunications calls.

Problem

Modern telecommunications networks are increasingly using the concept of an intelligent network, i.e., a network which derives routing data or derives data for otherwise treating telecommunications calls from a database shared by a plurality of switching systems. An example of such an intelligent network is the network used for carrying 800 calls. These calls, which are free to callers, are characterized by having a telephone number which is not directly related to the location of the called number. This is in contrast to normal telephone numbers wherein a three digit area code provides information as to the area to which a call is to be routed, a three digit office code usually provides information as to which central office in that area is to receive the call, and a four digit line number identifies a particular called customer within that office code. In contrast, any 800 number (i.e., a number whose first three digits are 800), whose next three digits are NXX, (wherein N is a number between 2 and 9 and X is a number between 0 and 9), followed by a four digit XXXX number, has no geographic significance. When a telecommunications network receives a call wherein the caller dials an 800 number, the network queries a database. A database translates the 800 number into a so-called POTS number (POTS=plain old telephone service) which later can be used in the conventional manner to route calls to a destination. The advantage of using an 800 number as opposed to simply using the POTS number is that the caller is immediately assured that there will be no charge for the call, a major consideration in soliciting business such as the ordering of merchandise or the reservation of an airline ticket or hotel accommodations.

The approach of using a database to determine routing information is also being considered in connection with service provider number portability, i.e., the ability of a customer to retain a telephone number even when the customer is served by a different carrier using a different switching system. For this application the database is accessed prior to routing calls to office codes whose telephone numbers are served from different switching systems belonging to different carriers.

A problem of the prior art is that the access time for querying a database in order to obtain the information required for routing a call is currently approximately 300 milliseconds. This access time is directly added to the call set-up time of telephone calls and slows down the completion of such calls. The use of common channel signaling which has become the prevalent and dominant mode in many areas has allowed the call set-up time to be reduced to a small fraction of a second under normal circumstances in which no database query is required. For the case of calls such as "800" (free) telephone calls, this is especially important since a database query is required for the 800 number, and the time of an additional query would be added to the call set-up time.

This problem is alleviated in accordance with the teachings of U.S. patent application Ser. No. 08/534,534 by the inventors of this application. Subject matter of their disclosure is reproduced herein because it forms a necessary background for the understanding of applicants' preferred embodiment; the subject matter of FIGS. 1–18 relates to this earlier invention.

A problem that is encountered in the implementation of the earlier invention or other solutions to this problem is that there is no satisfactory way of processing the call when a local database apparently provides the data necessary for routing the call, but when the call is routed to its destination, the terminating office has no records of the target directory number.

Solution

In accordance with applicants' earlier application, the local data contained within a switching system provides information as to whether or not a remote database query is required in order to establish a call to a particular telephone number. In accordance with one specific implementation, the data for indicating whether or not a database query is required, is maintained in a bit map using one bit per called directory number served directly or indirectly from the querying switch.

In accordance with one specific implementation in the earlier application, if it is determined that no remote data query is necessary this may be because of one of two factors, either that the query response is a default response or that the query response has been stored in memory at the querying switch. One example of a default response is the identification of a switch of one carrier in a situation in which the database query is used to find the identity of the carrier for serving a terminating call. In accordance with one feature of applicants' invention, the distinction between the default attribute and an entry in the data retained in the querying switching system is provided by a second bit map. Advantageously, the use of the second bit map eliminates a search of the data maintained in the querying switching system.

In one specific embodiment in applicants' earlier application, the database is used for routing calls in a number portability environment wherein the area code (NPA) plus office code (NXX) does not always identify which switching system serves a called number. Under these circumstances a local universal database (for processing calls within a local area) or a national database (for processing inter-local area (toll) calls) may be used. In such a situation, especially initially, a large fraction of the telephone numbers will continue to be served by a dominant local exchange carrier (such as one of the regional holding companies formed when AT&T divested itself of its local exchange carriers) so that the ability to identify called telephone numbers served by a dominant carrier will already reduce the call set-up time for a large fraction of calls. The call set-up time for many if not most of the remaining calls is reduced by having a modest size memory for storing the data for the most frequently called telephone number requiring an attribute other than the default attribute.

In accordance with applicants' earlier application, the centralized database remains the high reliability depository of the data that it contains. Periodically the data in the bit maps is cleared and the data for the most frequently called number is also cleared so that it can repopulate via access to the centralized database as calls are made. This will automatically update the memory of the individual switching system.

In accordance with applicants' present invention as described with respect to FIGS. 19–23, the problem remaining with the implementation of applicants' earlier invention or alternative solutions to that problem is solved by an arrangement wherein if an attempt is made to complete a call to a switch and that switch has no record of the terminating directory number, that switch returns an appropriate signaling message to the switch which controlled the routing to the terminating switch and the controlling switch then makes a query of a universal database, updates the local database, and re-attempts to complete the call. Advantageously, this arrangement causes the local database of the switch that originally routed the call to the incorrect terminating switch to be automatically updated and also allows the call to be completed. With the present very low targets for numbers of calls improperly handled that have been set by operating telephone companies, the preservation of the call is an important advantage. Further, the automatic updating of the local database avoids the need for a special updating and periodic audits.

BRIEF DESCRIPTION OF THE DRAWING

FIGS. 4–9 are flow diagrams of a method executed by the processor of the switch;

DETAILED DESCRIPTION

Figure 1:
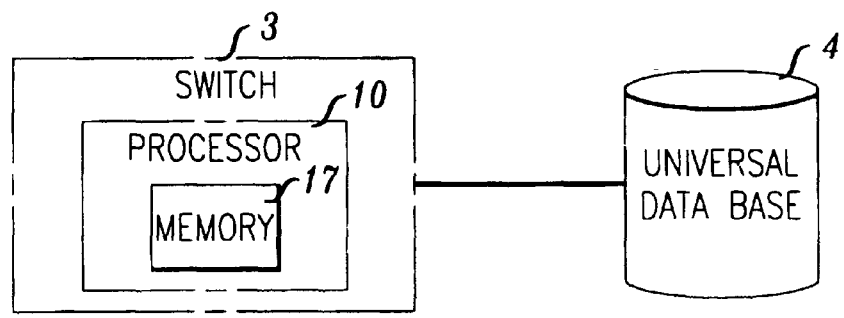
FIG. 1 is a block diagram showing a switching system (switch) connected to a database shared by a plurality of such switching systems for use in implementing applicants' invention.

FIG. 1 illustrates that a switch 3, comprising of processor 10 which in turn includes memory 17, accesses a universal database 4 whenever its own memory 17 does not contain specialized data required for processing a call (such as the identification of a switch for serving the termination of a call identified by a received telephone number). The call processing details for the specific case of number portability are described with respect to later figures.

Figure 2:
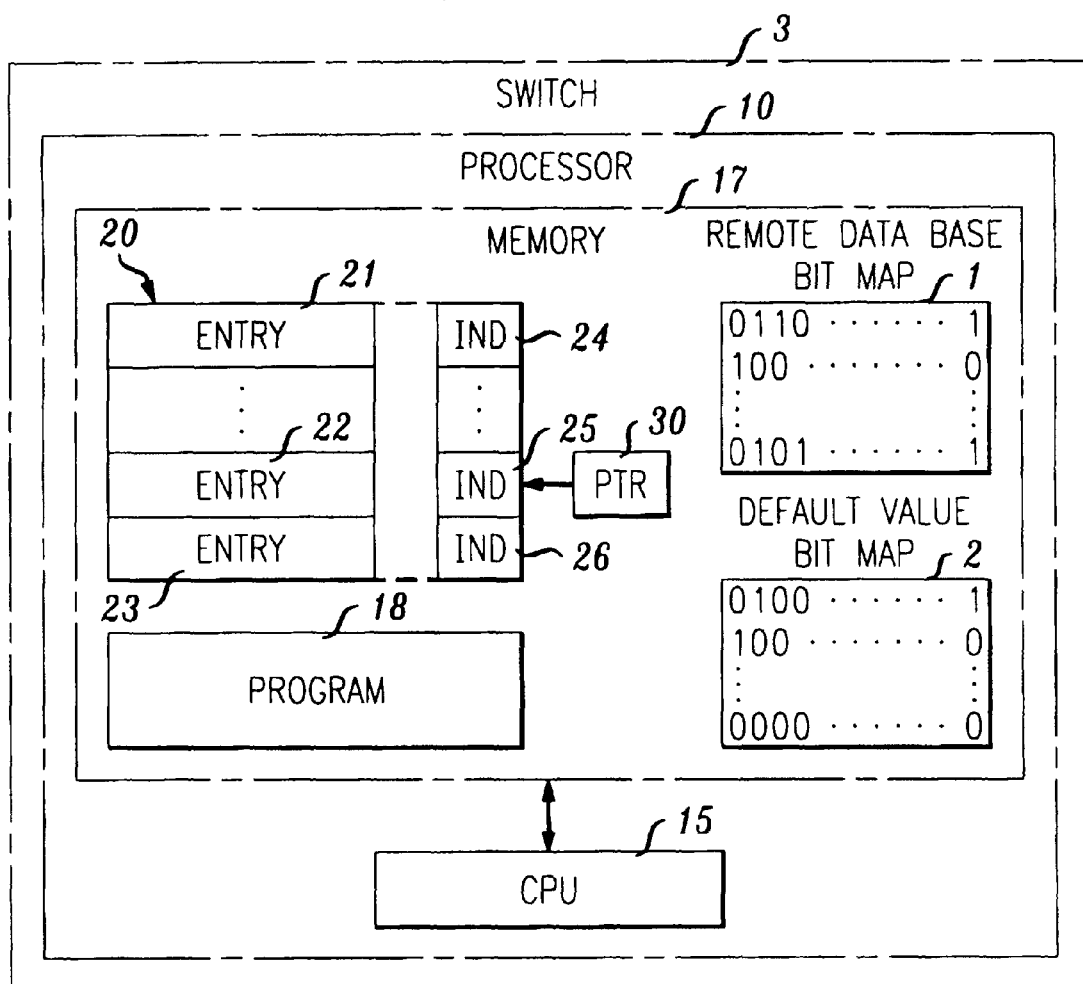
FIG. 2 and 3 are memory layouts of data and the program stored in the memory of the switch.

FIG. 2 illustrates the memory content of the processor that is pertinent to the implementation of applicants' earlier invention. Processor 106 is operative under the control of a program 18 for performing the actions of the flow charts shown hereinafter. This memory includes two bit maps 1 and 2 each having on bit per called telephone number whose routing is to be determined by switch 3. In addition, memory 17 includes a table 20 comprising a plurality of entries 21, . . . , 22, 23 each having a corresponding indicator, 24, . . . , 25, 26. A pointer 30, points to one of the entries and its corresponding indicator and is used to help remove one entry when another entry is to be inserted in the table. This action takes place if the universal database 4 is accessed and the result is other than the default attribute; under these circumstances an entry in table 20 which has been used relatively infrequently is deleted, and the corresponding bit map indicator changed to indicate that the data for this terminating directory number is no longer stored in the switch. The newly acquired entry is then placed in the location in table 20 vacated by the removed entry. A well known data structure, the AVL tree, described for example in D. F. Stubbs et al.; Data Structures with Abstract Data Types and Pascal, Brooks Cole Publishing Company, 1985, pages 225–234, is used to allow any entry to be placed anywhere in table 20 and to allow relatively rapid access to any such entry. Details of new entry insertion are described below with respect to FIG. 4.

Figure 3:
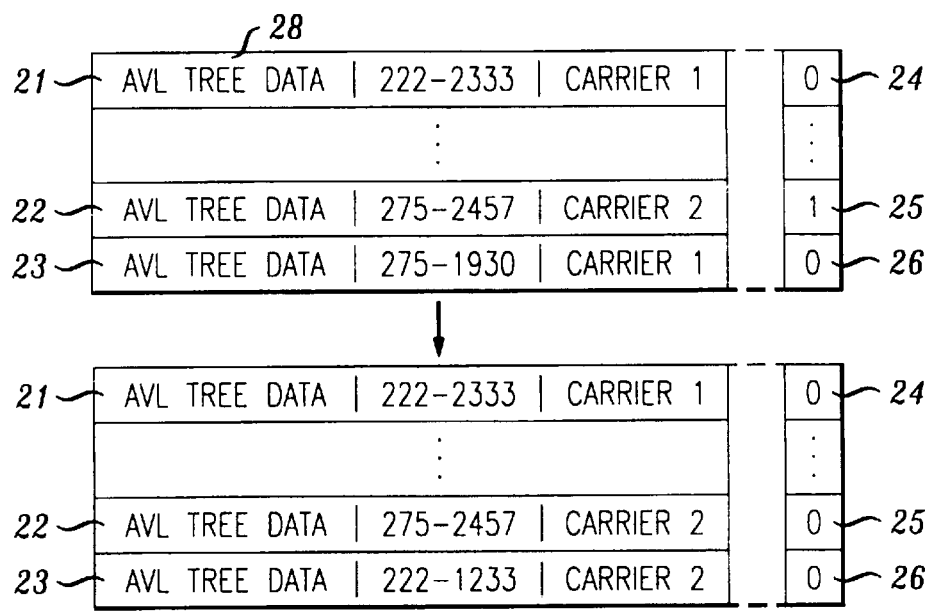

FIG. 3 shows two states of table 20. It is assumed in this case that switch 3 provided routing for calls to at least two office codes, namely 222 and 275. Entry 21 indicates that telephone number 222-2333 is served by carrier 1, that telephone number 275-2457 is served by carrier 2 and that telephone number 275-1930 is served by carrier 1. It is assumed in this case that all the telephone numbers served by switch 3 are in the same area code. Clearly if switch 3 is a toll switch, then a full 10-digit number would be required. The bottom portion of FIG. 3 then indicates that entry 23 has been deleted and data for telephone number 222-1233 served by carrier 2 has replaced the data in entry 23.

Figure 4:
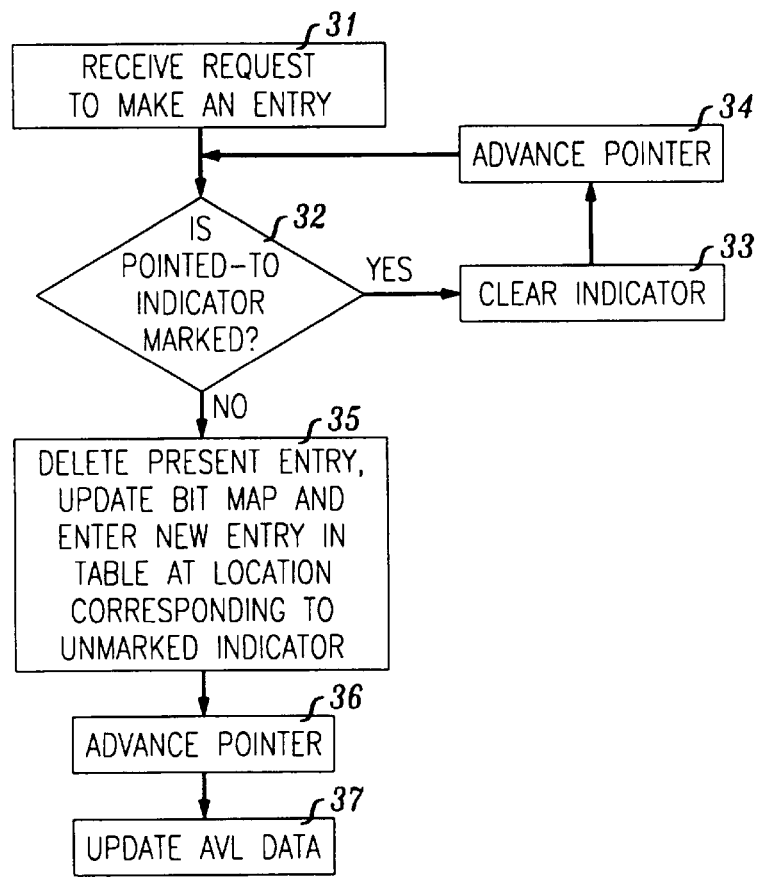

FIG. 4 illustrates the process of inserting an entry into table 20. Pointer 30 points one beyond the last place where an entry had been inserted into table 20. A request is received to make an entry into table 20 (action block 31). Test 32 is used to determine whether the pointed to indicator is marked. If it is, then that indicator is cleared (action block 33), the pointer is advanced (action block 34), and test 32 is repeated. If the result of test 32 is that the pointed to indicator is not marked, then the present entry is deleted, the bit maps for that entry are updated to indicate that data for the number corresponding to the present entry must now be accessed from the database, and the new entry is entered at the location corresponding to the unmarked indicator found in the last iteration of test 32. The bit pointer is advanced (action block 36) and the AVL data to link the entries in the table in such a manner that any particular entry can be found rapidly is updated (action block 37). The bit maps 1 and 2 must be updated as described hereinafter with respect to FIGS. 6 and 7.

FIG. 5 illustrates that the contents of table 20 are periodically refreshed by simply clearing all entries in the table and clearing all indicators in the table. Entries in the table are cleared by clearing the AVL tree data and by updating the bit maps 1 and 2 to indicate that nothing is now in the local data about any of the telephone numbers routed from switch 3. Periodically may mean every night at midnight or 2:00 a.m.; thereafter the first instance of any telephone number requires an access of the remote database 4. Then, calls as they come, now table 20 and populate the bit maps 1 and 2 for indicating that a particular directory number has the default value, i.e., in this case, is served by the dominant carrier, or to indicate that table 20 contains data for a particular telephone number. At the same time as table 20 is cleared, both bit maps are cleared which means that the remote database will be consulted for the next call for every number routed from switch 3. To clear data from table 20, the AVL tree data is cleared so that no entry is found in the search. The AVL tree data is cleared in such a way that subsequent attempts to enter data into table 20 are successful.

Figure 7:
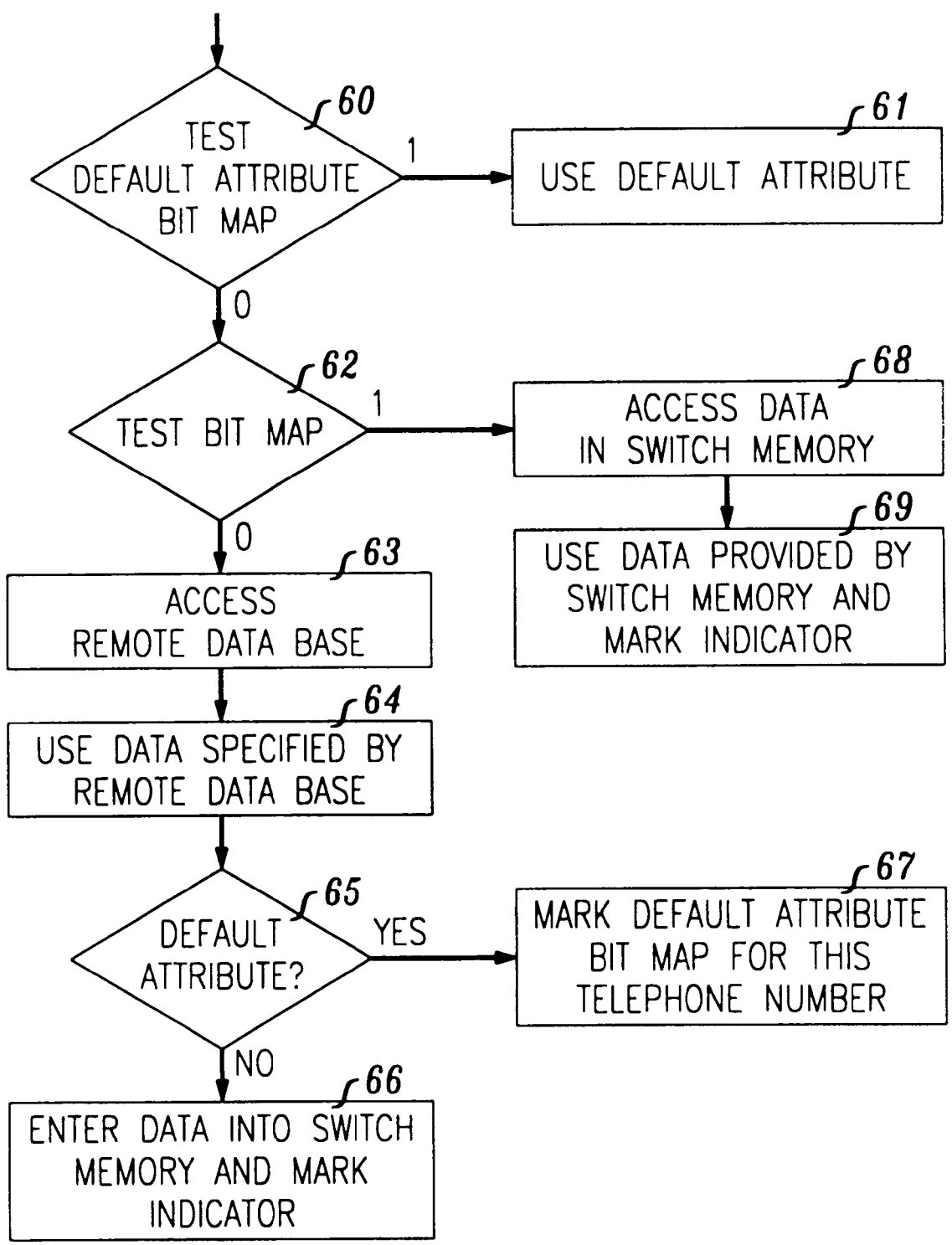

FIGS. 6 and 7 illustrate alternate processes for accessing data in either of the switch or the remote database. FIG. 6 illustrates the case in which only a single bit map (bit map 1) is stored in the switch; the bit indicates whether the required data is stored in the switch (bit=1) or whether the access of the remote database is required. Test 50 tests the state of the bit map 1 that corresponds to the directory number for which the data is being sought. If this bit is 1, then the required data may be obtained within the switch memory. Test 51 searches the switch memory for such data. If the data is not found, then the default attribute is used (action block 52). If the data is found, then the data provided by the switch memory is used, and the indicator in table 20 for that data is marked (action block 53). Marking the indicator ensures that this table entry is not an immediate candidate for being deleted from the switch memory in the sequence of FIG. 4. If the result of test 50 is that the bit is zero, then the remote database is accessed (action block 54). The data specified by the remote database is then used (action block 55). The bit map for the telephone number for which a query has been made is marked in preparation for indicating that the default attribute is applied to this number or that the appropriate data is stored in switch memory (action block 56). Test 57 determines whether the data found is the default attribute. If so, no further processing action is required; if not, the data found in the remote database is entered into switch memory (action block 58), and the indicator for this data entry is marked to 1 to ensure that it is not an immediate candidate for removal.

FIG. 7 illustrates the case in which 2 bit maps are used. The advantage of using 2 bit maps if that it saves the time required to search table 20 or any equivalent thereof in order to determine whether the data associated with the telephone number to which the data request has been made is the default attribute (in which case no data entry is stored). The disadvantage is the cost of storage of the second bit map.

When a data access is required, the default attribute bit map (bit map 2), is tested (test 60). If the result of this test is a 1, then the default attribute is used (action block 61). Thee advantage of the arrangement of FIG. 7 is that since the most frequently used instance of the data, namely the default attribute, is found very quickly. If the result of test 60 is that the but corresponding to the telephone number for which data is being sought is a zero, then a second bit map which corresponds to bit map 1 of FIG. 2 is tested (test 62) to determine whether the required data is to be found in the memory of the switch or is to be found in the remote database. If the value of the bit is zero, then the remote database is accessed (action block 63) and the data specified by the remote database is used (action block 64). Test 65 is used to determine whether the data found from the remote database is the default attribute. If not, then the data is entered into switch memory and the indicator for that data entry is set to 1 (action block 66). If the data returned by the remote database is the default attribute, and it is possible that the remote database instead of returning a default attribute simply returns a no data found message which is interpreted by switch 3 as representing the default attribute, then the default attribute bit map (bit map 2) for this telephone number is marked (action block 67), and the default attribute is used.

If test 62 indicated that the bit is 1 i.e. that the data is to be found in switch memory, then switch memory to accessed to find this data (action block 68). The data provided by the switch memory is used and the indicator for that data entry is marked in order to ensure that this data entry is not an immediate candidate for deletion (action block 69).

A third possibility, common attribute bit maps instead of one default attribute bit map, is that only a default attribute bit map is used and that data such as that stored in table 20 is not kept in the switch. For this situation, the switch accesses the remote database for all telephone numbers for which a default attribute has not yet been confirmed by the remote database. In alternative, or for the case described with respect to FIG. 7, it is also possible to have several bit maps corresponding to several common attributed (frequently used attributes) which in this case would be the several most common instances of the requested data. In the case of the number portability application this would be for the dominant carrier and several most frequently used alternate carriers.

Figure 8:
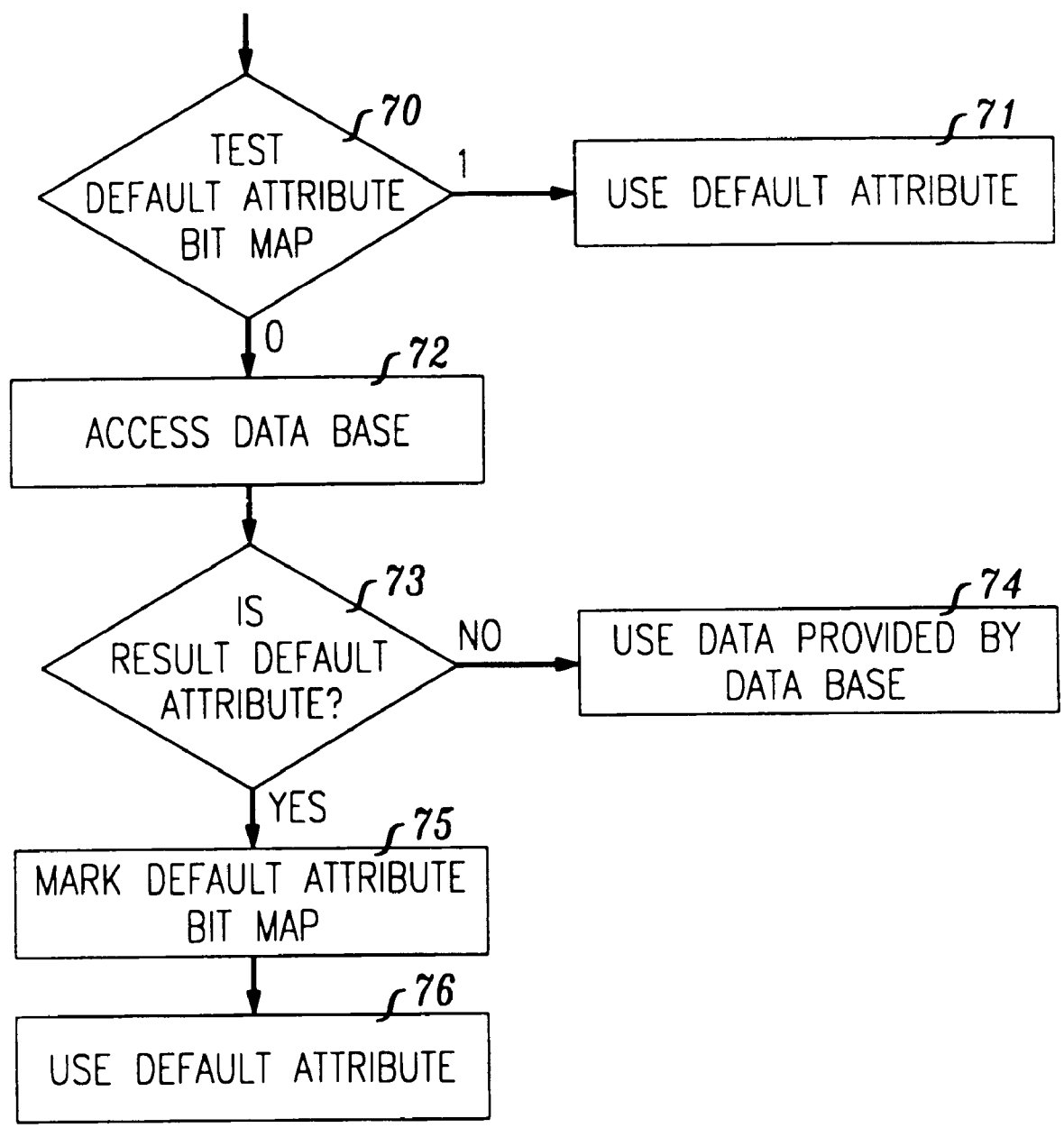

FIG. 8 is a flow diagram illustrating the use of the default attribute bit map only. The default attribute bit map is accessed using the telephone number for which data is required. If the result of test 70 is that a 1 was found in the bit map then the default attribute is used (action block 71). If the result of test 70 is that a 0 was found, then the database is accessed (action block 72). Test 73 tests the result of the database access to determine whether it is the default attribute. If not, the data found in the database is used (action block 74). If the result is a default attribute, then the default attribute bit map is marked (action block 75) and the default attribute is used (action block 76).

Figure 9:
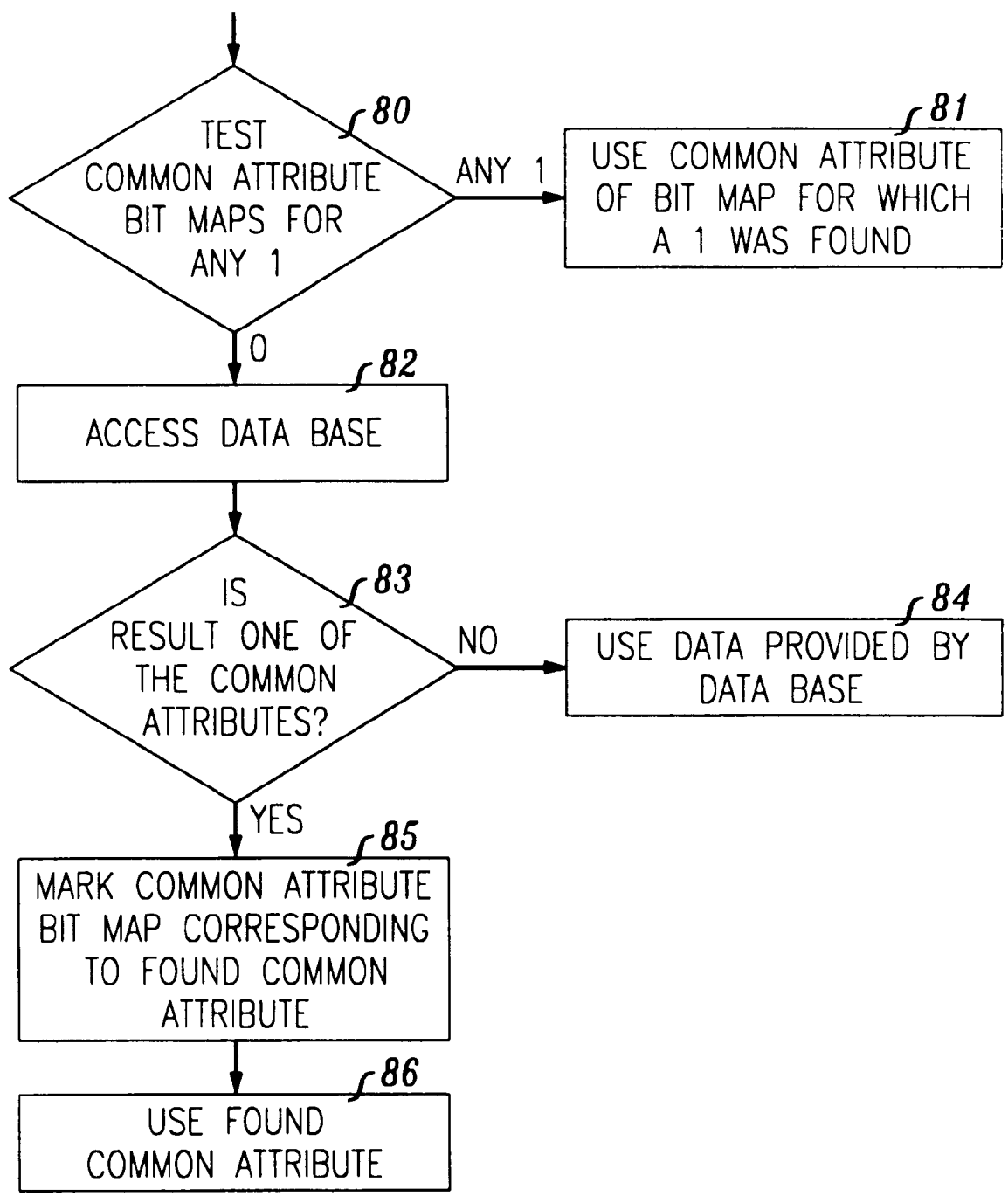

FIG. 9 considers the case in which there is not a single default attribute map, but a plurality of common attribute maps. Each of the common attribute maps is tested to determine whether the bit corresponding to the telephone number is 1 in any of these bit maps. If so then the common attribute of the bit map for which a 1 was found is used (action block 81). If all zeros are found then the database is accessed (action block 82). Test 83 then determines whether the result found in the database is one of the common attributes, if not then the data provided by the database is used (action block 84). If the result is one of the common attributes, then the common attribute bit map corresponding to the found common attribute is marked (action block 85) and that found common attribute is used as the data (action block 86).

For both the cases described in FIG. 8 and FIG. 9 in order to maintain the integrity of the database, it is simply required to clear the default attribute bit map (FIG. 8) or all of the common attribute bit maps (FIG. 9) and to repopulate these bit maps as telephone calls are made.

FIGS. 10–18 illustrate a specific system arrangement in which the principles of applicants' earlier invention as described with respect to FIGS. 1–9 can be applied in one preferred embodiment. The teachings of the present invention are used to implement action blocks 309, 401, 505, and 603 of FIGS. 12, 13, 14, and 15. Where alternate carriers are specified for a telephone number, an entry in table 20 or in the remote database is required unless it is decided that a "default" attribute should be reserved for a very frequently used pairing of preferred and alternate carrier, and multiple "default" attribute bit maps are used.

Figure 10:
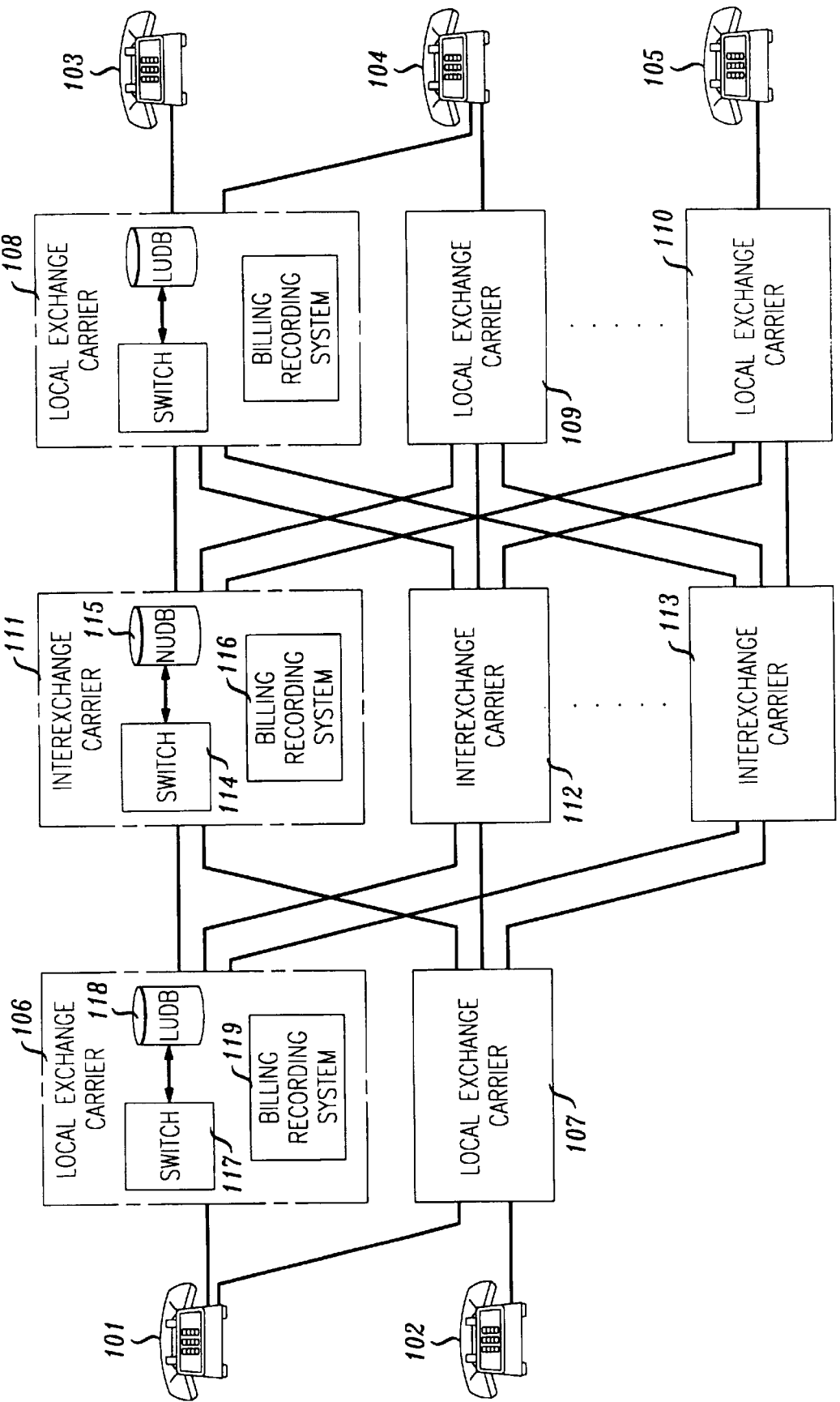
FIGS. 10 and 11 are block diagrams of a specific implementation.

FIG. 10 is a block diagram showing the relationship between telephone customers, local service providers (i.e, local exchange carriers) and interexchange carriers. Individual customers 101–105 serve to originate or terminate telephone traffic. Some of these customers, such as customers 101 and 104, are connected to two carriers in order to provide especially reliable service. Local exchange carriers 106–110 are connected to the customers and are connected to interexchange carriers 111–113. Each local exchange carrier includes one or more switches 17, a local universal database (LUDB) 118 and a billing recording system 119.

Alternatively, a local universal database can be shared by several or all local carriers. The switches are for establishing telephone connections in the conventional way and are interconnected by the links shown in FIG. 10. The database 118 need only contain data for the telephone numbers of the region served by the local exchange carrier. Each of the local exchange carriers serving a particular region stores in its database data concerning all the numbers of the region so that in a broad sense, each of the databases contain the same data. The database for a particular region and a particular carrier is accessed through data links from each of the switches of the carrier serving that region. While FIG. 10 shows individual databases for each local exchange carrier, these databases could be shared among a plurality of such local exchange carriers; this is particularly straightforward since the databases are accessed using data links.

The local exchange carriers are connected to interexchange carriers 111, 112, . . . , 113, each of which contains one or more switches 114, and access to a national universal database (NUDB) 115 and a billing record system 116. The remarks made previously about the local database are also applied to the national database which, of course, is very much larger. This national database can be concentrated or distributed and can be shared among a plurality of interexchange carriers since it is accessed by data links from the switches that use the data of the database.

Figure 11:
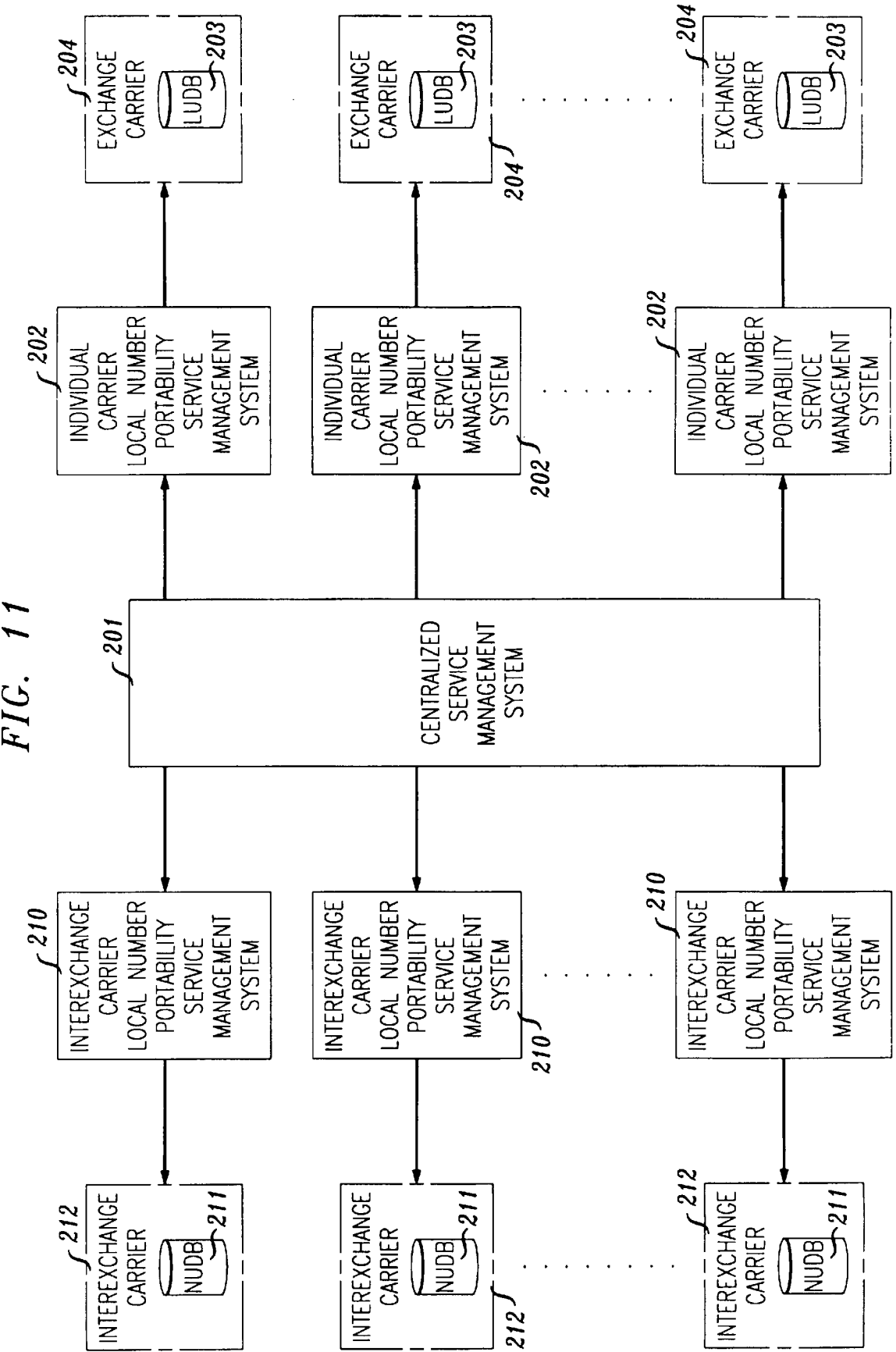

FIG. 11 shows an arrangement for updating the local and national databases. A centralized service management system 201 transmits update messages to individual carrier local number portability service management system 202 which transmit update messages to the local databases 203 of each of the carriers 204. Similarly, the centralized service management system 201 transmits data messages to interexchange carrier local number portability service management systems 210, each of which are used to update the national databases 211 of each of the carrier 212.

Local access providers must provide update information to the centralized service management system 201. The customer's new local service provider is responsible for the update for the case in which the customer changes service providers. When a customer switches carriers, the original local carrier may be required to forward calls for a short period (a few days) until the database has been updated.

Figure 12:
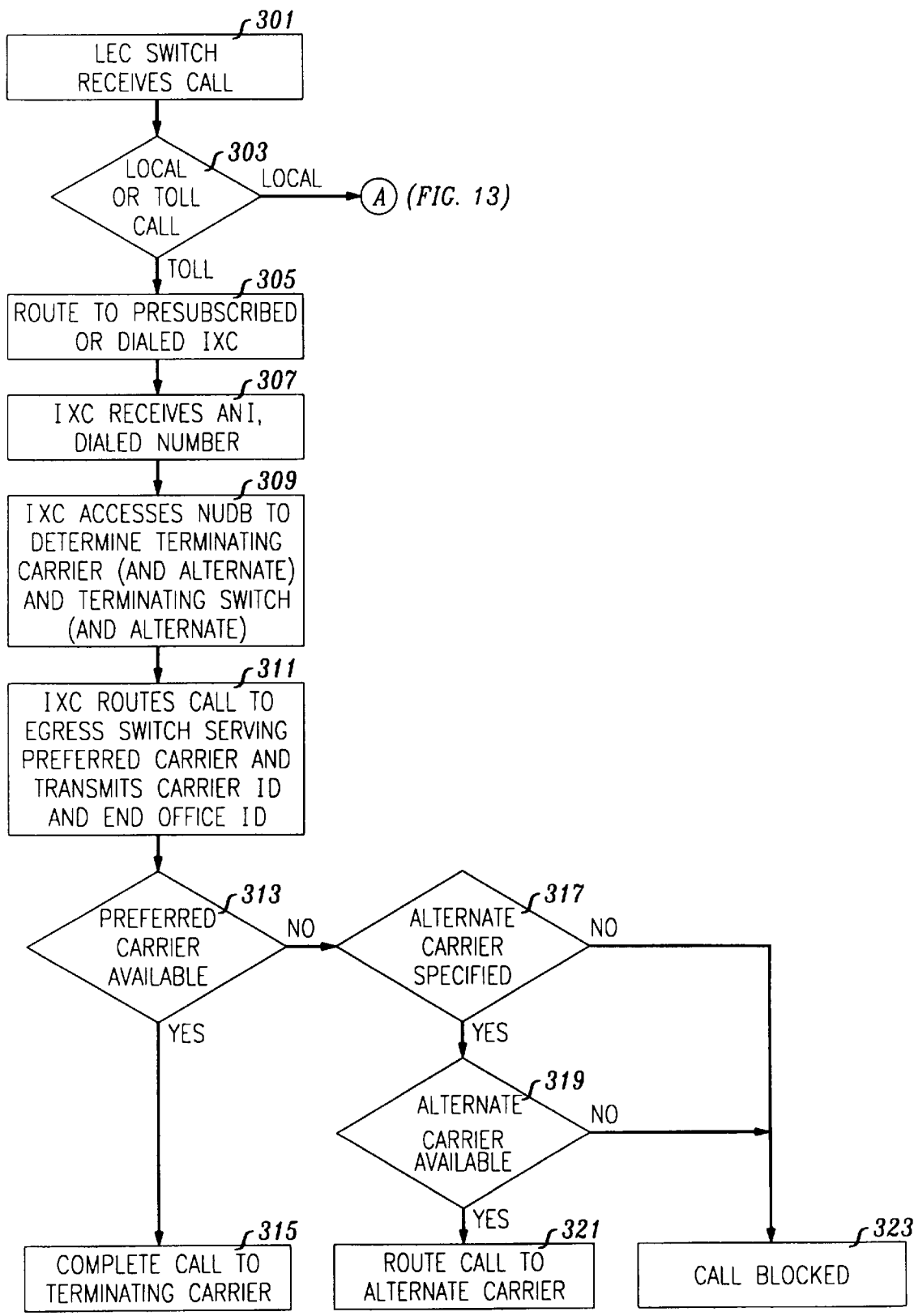
FIGS. 12–15 are flow diagrams of the application of FIGS. 10 and 11.
Figure 13:
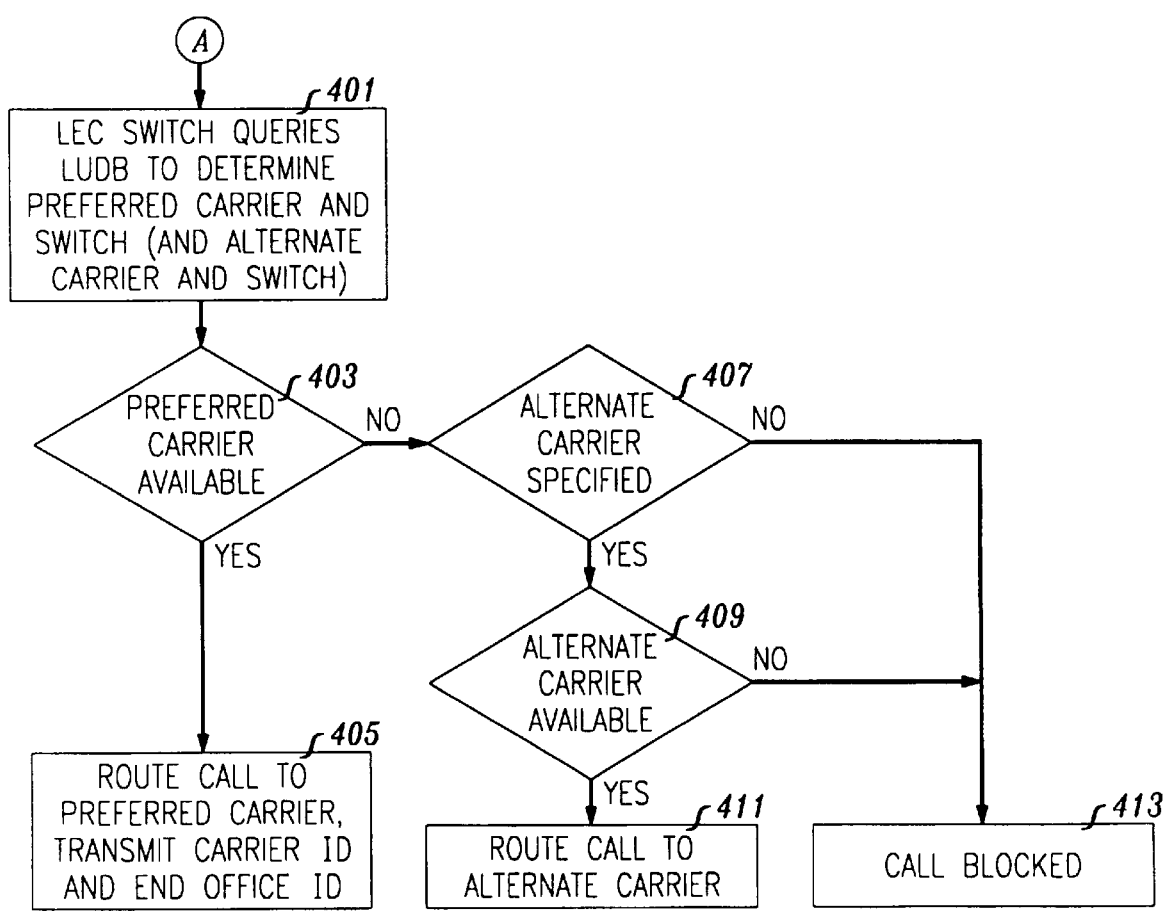

FIG. 12 is a flow chart of the routing procedure for this kind of arrangement. The local exchange carrier switch receives the call (action block 301). The local carrier switch makes a translation whether this is a local or a toll call (test 303). If geographic number (location) portability has been implemented in the region where the call is received, then in order to successfully complete test 303, the local database will return the preferred terminating local exchange carrier and the switch from which the terminating customer is served and this can be used in conjunction with the identification of the originating switch to determine whether this is a local or toll call. A call will also be a toll call if it is recognized that the local database will not contain data for that terminating customer. This can be determined, for example, from the NPA code of the terminating customer, or if geographic number (location) portability has not been implemented from the office code of the called number. If as a result of test 303 it is determined that this is a toll call, then the call is routed to the pre-subscribed interchange carrier or if the customer specifies an interexchange carrier by dialing an appropriate code, then to the specified dialed interexchange carrier (see action block 305). The interexchanged carrier receives the Automatic Number Identification (ANI) of the calling customer, and the Dialed Number (action block 307). The interexchange carrier then accesses the national database to determine the terminating carrier (and alternate where provided) and the terminating switch (and alternate where specified) (action block 309). The interexchange carrier then routes the call to an egress switch serving the preferred terminating carrier and transmits the terminating carrier and local office identification (action block 311). Test 313 determines whether the preferred carrier is available; if so, the call is completed to the called customer via that terminating carrier (action block 315). If the preferred carrier is not available (negative result of test 313), then test 317 determines whether an alternative carrier has been specified. If so, then test 319 determines whether the alternate carrier is available. If so, the call is routed to the alternate carrier for completion to the called customer (action block 321). If the alternate carrier is unavailable, then the call is blocked and given blocked call treatment (action block 323). Similarly, if no alternate carrier had been specified (negative result of test 317) then the call is also blocked (action block 323).

If the result of test 303 for determining whether this is a local or toll call is that the call is a local call, then action block 401 (FIG. 13) is entered. In action block 401 the local exchange carrier switch queries the local database to determine the preferred carrier and switch (and alternate carrier and switch is so specified). Test 403 is used to determine whether the preferred carrier is available. If so, then the call is routed to the preferred carrier, and the terminating carrier and end office identification are transmitted toward the terminating carrier (action block 405). If not, test 407 determines whether an alternate carrier has been specified. If so, test 409 determines whether the alternate carrier is available. If so, then the call is routed to the alternate carrier for completion to the called customer. If the alternate carrier is not available (negative result of test 409) or if no alternate carrier had been specified (negative result of test 407) then the call is given blocked call treatment (action block 413).

Figure 14:
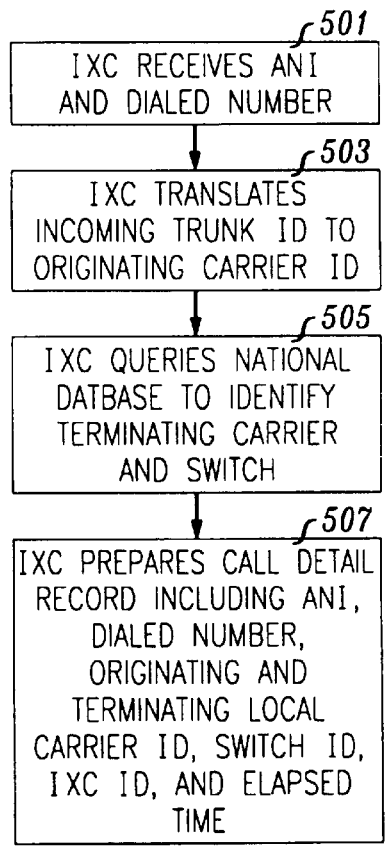

FIG. 14 is a flow diagram showing the actions performed for billing a toll call. The interexchange carrier receives the ANI and Dialed Number (action block 501). The interexchange carrier translates the incoming trunk identification to identify the originating carrier (action block 503). Alternatively, signaling information from the originating carrier can identify the carrier. The interexchange carrier then queries the national database to identify the terminating carrier and switch for the called number (action block 505) and the interexchange carrier prepares a call detail record including the ANI, Dialed Number, originating and terminating local carrier identification and switch identification, the interexchange carrier identity (in case billing records are processed for several carriers by a single processor), and elapsed time for the call (action block 507).

Figure 15:
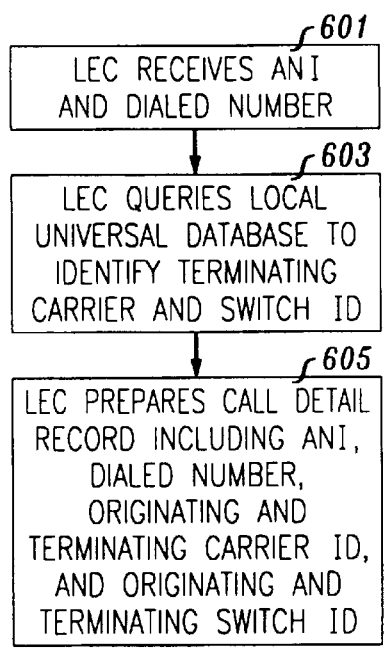

FIG. 15 is the billing procedure for local calls. The local carrier receives the Dialed Number and the ANI of the originating customer (action block 601). The local carrier then queries the local database to identify the terminating carrier and switch based on the Dialed Number (action block 603). The local carrier then prepares a call detail record including the ANI, Dialed Number, the terminating carrier and terminating switch identification.

For the case that the alternate terminating carrier is used, the alternate terminating carrier and switch are substituted for the preferred carrier and switch in the call detail record.

Figure 16:
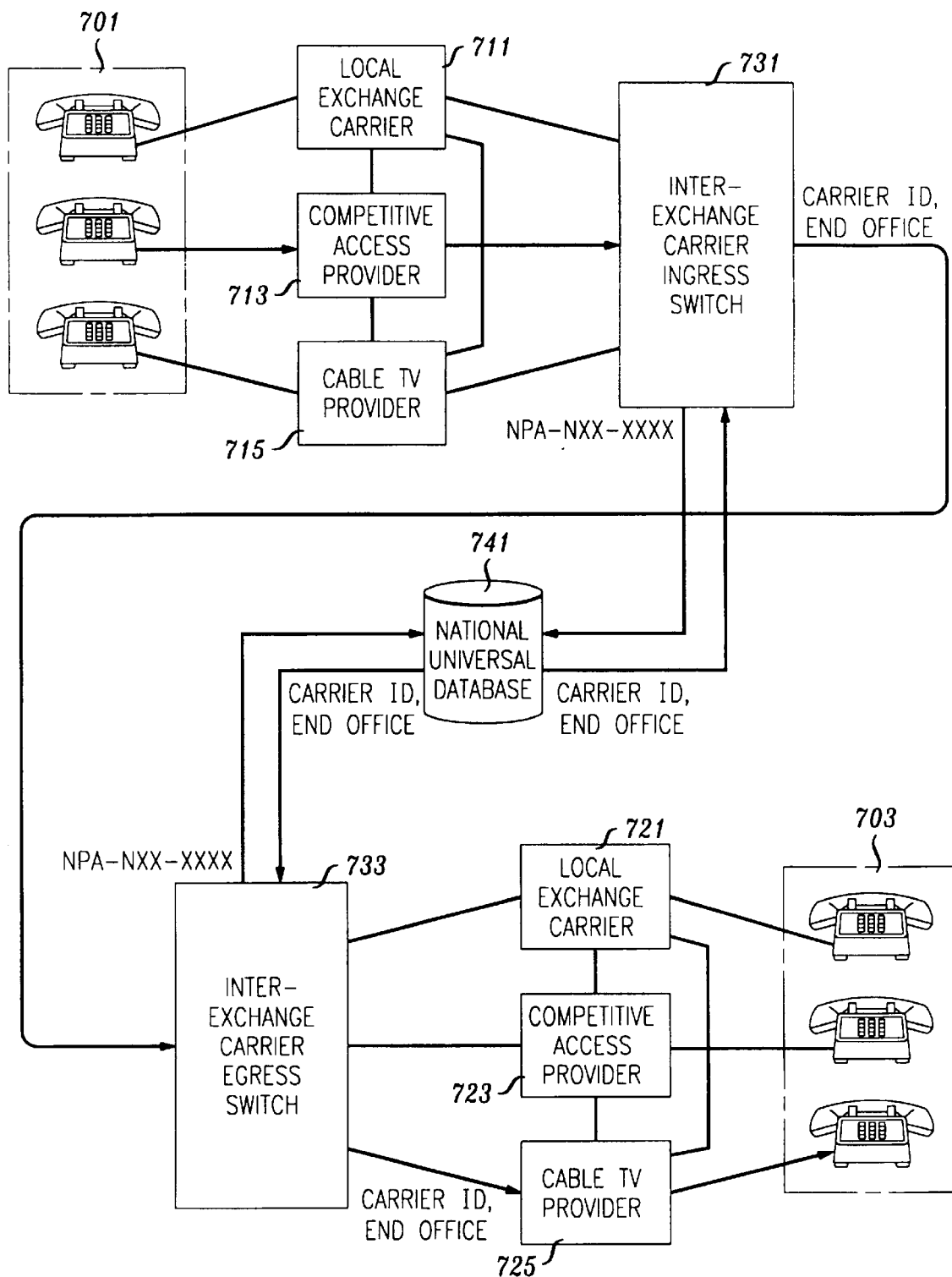
FIGS. 16–18 are further block diagrams illustrating the implementation.

FIG. 16 illustrates a toll call and illustrates some of the ways in which the arrangement described herein has flexibility. A customer 701 has access to three different local carriers: namely, Local Exchange Carrier 711, Competitive Access Provider 713 and Cable TV Provider 713. When the toll call arrives at the ingress switch 731 of the selected interexchange carrier, the call is routed to the egress switch of interexchange carrier 733, either the ingress switch of the egress switch may query a national universal database 741 to obtain information as to the carrier and office serving the called customer. The interexchange carrier switch querying database 741 supplies the called party number (NPA--NXX--XXXX) and receives in response the identity or identities of the carrier(s) and end office(s) of the local carrier serving the called customer. It is also possible that the database is queried from an intermediate switch of the selected interexchange carrier; this might happen, for example, if the call is of a special type handled by a specialist interexchange carrier switch. At any rate, the egress switch is informed, either by the querying switch, or directly by the database if the egress switch is the querying switch, of the identity of the preferred carrier(s) and the identity of the end office for each such carrier. The call is then routed, in this case via CATV carrier 725, to the terminating customer. Note that in the terminating region there is also a Local Exchange Carrier 721 and the Competitive Access Provider 723, so that there is an alternative for completing the call to the called customer 703. In order to provide revenue to the carrier that actually processed the call, the identity of the originating and terminating local carrier, as well as the interexchange carrier, are provided either explicitly to the call detail records of implicitly because the record is made by a particular carrier.

Figure 17:
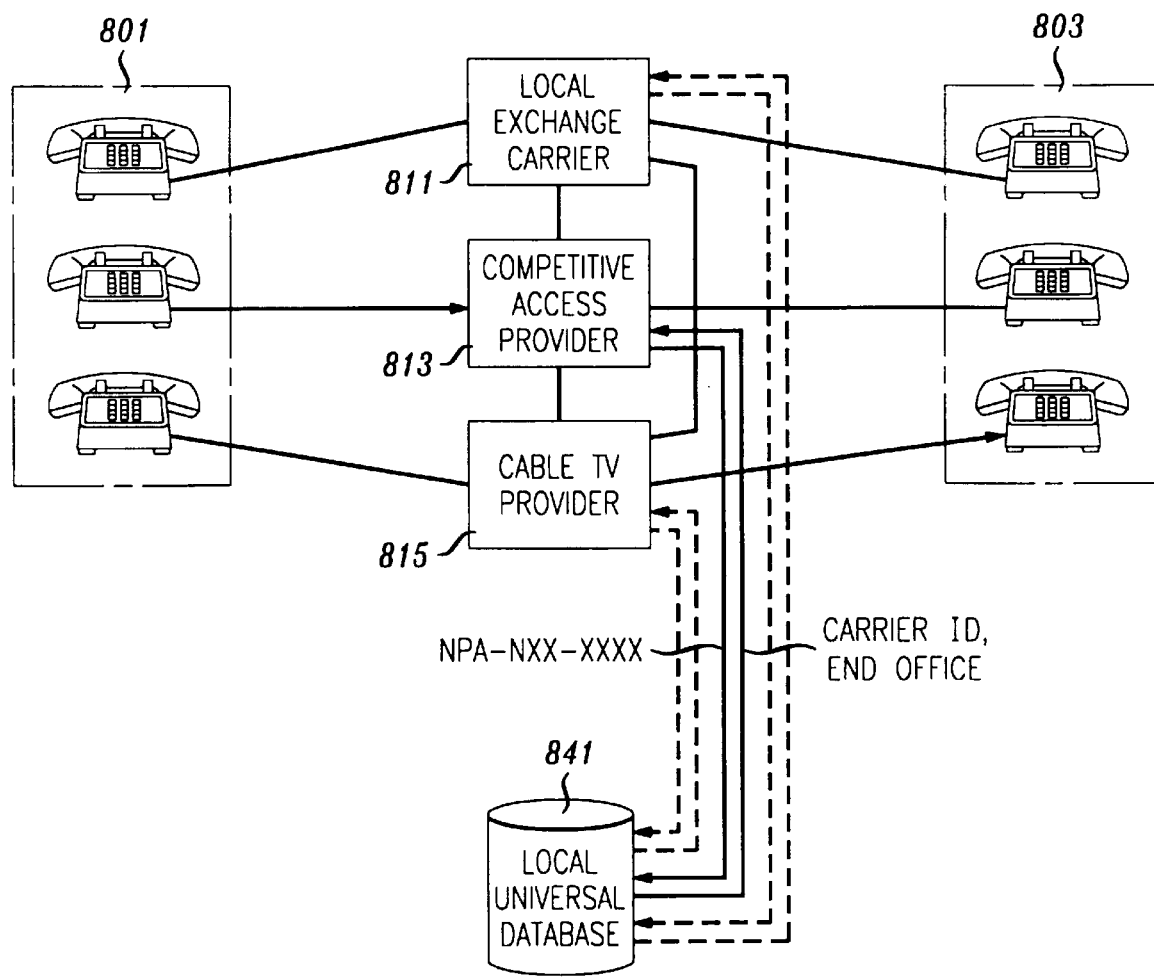

FIG. 17 illustrates a local call and illustrates some of the ways in which the arrangement described herein has flexibility. A customer 801 has access to three different local carriers, namely local exchange carrier 811, Competitive Access Provider 813 and Cable TV provider 815. Assume that this customer elects for a particular call to use the Competitive Access Provider 813. When the local call arrives at a switch at Competitive Access Provider 813, the switch from the Competitive Access Provider 813 accesses local universal database 841 with the dialed number (NPA-NXX-XXXX) and receives in response the identity or identities of the carrier(s) and end office(s) of the local carrier serving the called customer. The Competitive Access Provider then routes the call via the preferred carrier which may be local exchange carrier 811 or Cable TV provider 815. Note that in the particular case where illustrated in the diagram wherein called customer 803 has access to all three carriers, the call can be routed via a non-preferred carrier if access via the preferred terminating carrier is blocked. In order to provide revenue to the carrier that actually processed the call, the identity of the originating and terminating local carrier are provided either explicitly to the call detail records or implicitly because the record is made by a particular carrier.

While in the preferred embodiment, the interexchange carrier accesses the national database, the originating carrier can alternatively be arranged to access that database, the originating carrier can alternatively be arranged to access that database and forward the identity of the terminating carrier(s) and switch(es) to the interexchange carrier.

For a local operator assistance call, the local carrier determines that the call is a local operator call and sends the call to a local operator assistance system which may be part of the calling party's local carrier network, or in another local network (operator systems can serve multiple local networks). The originating local carrier is identified to the operator system either by incoming trunk information or signaling. The operator system performs the requested operator service and then queries the LUDB to get the terminating carrier and terminating switch. It routes the call to the terminating carrier, passing the carrier and switch identification. The operator system makes a call detail record that includes both the originating and terminating, carrier and switch, identifications.

For a toll operator call, the local carrier determines that the call is a toll operator call and sends the call to the subscribed or dialed toll carrier operator system. The originating local carrier is identified to the toll operator assistance system either by incoming trunk information or signaling. The operator system performs the requested operator service and routes the call to a toll ingress switch. From here, routing is the same as a toll call—the ingress toll switch queries the NUDB, etc. When the toll call is successfully routed, the terminating carrier and switch identifications are signaled in the backwards direction to the operator system to be included in the call detail record. Essential to the implementation of Local Number Portability (LNP) is the ability to associate a network destination with a ported dialed number. This information, identified as a Location Routing Number or LRN, will necessary indicate the specific switching entity which serves the called party and, therefore, to which the call must be routed. Clearly, the LRN will be the key element in the LNP database.

An LTN must be selected for each switching entity which terminates subscriber lines. Although LNP, and in particular, the use of an LRN will significantly impact call processing in all networks, the format of the LRN can be selected to minimize the required network changes. Specifically, it would be desirable if the use of the LRN:

allowed the continued use of current network routing methods permitted the use of existing signaling protocols avoided the need for new technical standards Any number of formats might be considered for use as an LRN. For example, a simple 5 digit numeric code would allow the unique identity of up to 100,000 end offices. Alternatively, the code could be designed to include routing information indicating, for example, a region of the country in which the end office was located; or the code could be designed to include the identity of the local service provider. All of these suggestions, however, fail to satisfy the most important of the above mentioned criteria—the need to retain the current routing algorithms in all network switches. Today, routing is based upon the geographic information contained in North American Numbering Plan (NANP) numbers—specifically the first six digits of those numbers or NPA-NXX. Accordingly, the use of an LRN in a format other than NPA-NXX would create the need to develop routing based upon the new code. It appears appropriate, therefore, that the LRN retain the format of the numbering plan used to identify end offices today; that is, NPA-NXX.

In accordance with applicants' teachings, a unique LRN, in the form of NPA-NXX, is assigned to each switching entity which terminates subscriber lines. The LRNs are assigned by a code administrator, likely the same administrator responsible for local number administration. Existing end offices which are presently associated with one or more NPA-NXXs, would select one of the NPA-NXXs currently assigned to the office as the LRN. Local service providers establishing new switching entities would naturally, request and receive and LRN from the administrator. An LRN need not contain the NPA-NXX code of any customer served by the switch identified by the LRN.

To avoid routing complexities it is important that an LRN assigned to any end office not be an NPA-NXX assigned to any other end office. For example, consider a large end office which currently uses four NPA-NXXs to identify customers served from that office. One of the four NPA-NXXs to identify customers served from that office. One of the four NPA-NXXs would be selected as the LRN for that office. The LRN for any other end office should not be selected from any of the three (non-LRN) codes assigned to the existing end office. This constraint eliminates the need to establish separate routing tables—or domains—to distinguish routing based upon LRNs—for those dialed numbers that have been ported—from routing based on the dialed number for those numbers that have not been ported. Rather, routing tables as they exist today, would be used to effect call completion. Finally, it is assumed that information associated with LRNs, such as service provider name, common location language identifier (CLLI) code, tandem routes, vertical and horizontal graphics coordinates, etc., would be added to the Local Exchange Routing Guide (LERG)

Equally important in the selection and use of an LRN is its compatibility with the existing signaling methods used to transmit the necessary address information required for proper call completion. Signaling messages are necessary to provide this information either directly to the terminating switch or to an intermediate or tandem office. It will be necessary to carry both the LRN as well as the dialed number (DN) along the signaling path. The LRN is clearly required for call routing and the DN is needed by the serving end office to effect the connection to the loop assigned to the called party. The following describes the methodology through which existing signaling methods can be used to forward this information.

Typically, signaling information is carried over a dedicated, common channel signaling network using the SS7 protocol. Call set-up is effected using an initial address message (IAM) which contains several parameters, each containing specific information related to the call. This signaling method is used to provide call completion in a number portable environment by simply modifying the use of existing parameters. Although the modification of the use of these parameters requires industry agreement, it should not involved the more complex an time consuming exercise of establishing and implementing the use of an entirely new signaling parameter within the SS7 message.

Specially, the SS7IAM parameters that are involved ar the called party number (CdPN) parameter and the Generic Address Parameter (GAP). Today, for non-featured calls the CdPN parameter is populated with the DN and call routing is performed using this number. (A non-featured call is one who dialed directory number is used for routing the call, in contrast, for example, to 800 calls wherein the dialed number cannot be used directly for routing.) The GAP is an optional parameter designated to transport a "user provided number" and is currently used in only a few instances. It is proposed that when a ported call is processed and an LRN is received as a response from an LNP database, the LRN is populated in the CdPN parameter of the IAM. It is further proposed that the DN be transmitted in the GAP. The contents of the CdPN parameter (the LRN) will be used as necessary to route the call. Because the information is in the NPA-NXX format, routing should proceed without change. At the terminating end office the 6 digit format of the LRN can be identified by the switch to indicate a call for completion to a ported number. With that identification, the switch can be instructed to locate the number originally dialed—and necessary to identify the called party—in the GAP.

Figure 18:
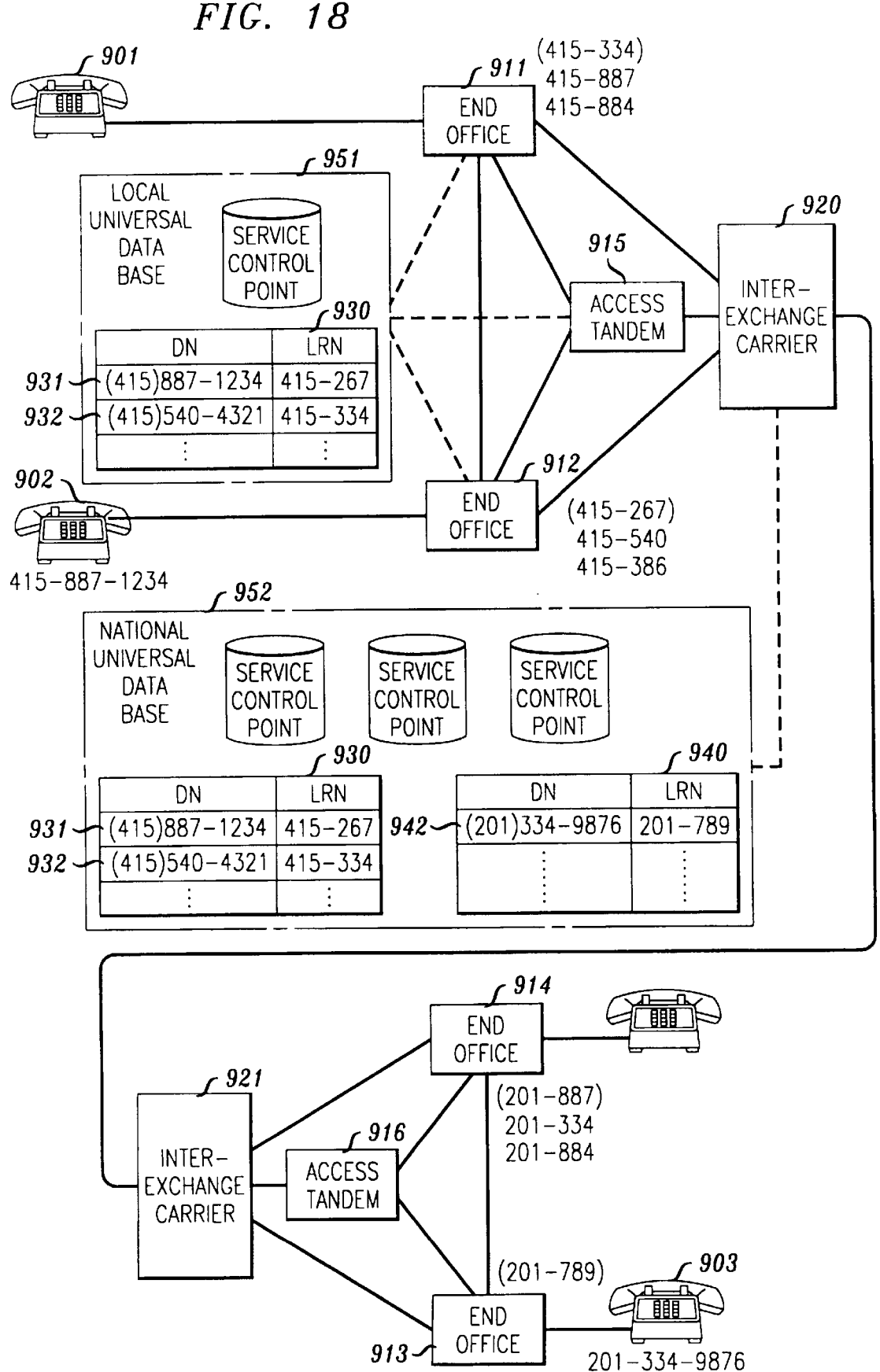

FIG. 18 illustrates the operation of applicants' earlier invention with respect to the use of a location routing number. Telephones 901, 902, and 903 are connected to end offices 911, 912, and 913, respectively. End offices 911, and 912 are in the same local region, whereas, end office 913 is connected to end offices 911, and 912 via trunks interconnecting interexchange carrier office 920 and 921. Access tandems 915 and 916 are used for accessing the interexchange carrier and for interconnecting the end offices to databases as shown as local universal database 951 and national universal database 952. For each end office, a set of office codes deserved by that office is shown. The particular office code which is also used as the location routing number is shown in parentheses.

In the particular example shown, telephone station 415-887-1234 is connected to end office 912 having location routing number 415-267. End office 911 serves the bulk of the telephones having telephone numbers in the 415-887 office code. When telephone 901 calls telephone 902 having telephone number 415-887-1234, a check is made in local universal database 951, table 930, and an entry 931 is found indicating that telephone 415-887-1234 is served by an end office identified by location routing number 415-267, i.e., end office 912. If no entry had been found for telephone 415-887-1234, then the call would have been routed using the 415-887 code to end office 911.

If telephone 901 calls telephone 903 having telephone number 201-334-9876, such a call is identified as being an inter-LATA (inter-local access transport area) routed to an interexchange carrier which accesses a national universal database in order to find the identity of the switch serving the terminating telephone. It is necessary to identify this switch in order to route via an exchange carrier that serves the identified switch. The national universal database 952 has an entry 942 in table 940 for telephone number 291-334-9876 and that entry indicates that the location routing number of the terminating end office is 201-789. If no entry had been found then the 201-334 office code would have been used to route the call to end office 914 which serves the bulk of the 201-334 office code traffic.

Note that the databases need only store data for the numbers that are not served by the local switches serving the bulk of the numbers of a particular office code. Data need only be stored for the numbers of customers who have moved from such a switch to another.

Consider the toll call associated with FIG. 18 in more detail.

1. An interLATA call is generated by an end user in California to a called party in New Jersey. The dialed number is (201) 334-9876.

2. The call is recognized by the originating end office as an interLATA call and the call is forwarded to the presubscribed interexchange carrier (IC).

3. Although the IC could test to identify the DN at either the originating or terminating switch in its network assume the identification is performed at the originating IC switch. Specifically, the first 6 digits (201-334) of the DN are analyzed and identified as a potentially ported number.

4. Database query is launched to the appropriate NUDB database with the DN (201) 334-9876.

5. Because the number has been ported, the response from the NUDB database includes the LRN (201-789).

6. The call is routed based upon the LRN and the originating IC switch formulates an SS7IAM (initial address message).

7. The CdPN parameter is populated with the LRN (201-789) and the DN (201) 334-9876 is inserted in the GAP.

8. The terminating IC switch routes the call based upon the LRN and generates a signaling message to the designated end office.

9. If the terminating end office is SS7 and "LNP capable" (LNP=Local Number Portability) (i.e. capable of recognizing the modified signaling message):

End office checks contents of CdPN parameter, recognizes the 6 digit format and identifies the call as an "LNP" call.

End office uses the information in the GAP (the DN) to route the call to the appropriate subscriber loop.

10. If the terminating end office is to LNP capable, the (n-1)st switch (i.e., the switch transmitting the signaling message) must format the signaling message so that the DN is contained in the CdPN parameter.

11. Similarly, if the EO is not SS7 compatible, the DN will be forwarded using in-band (MF) signaling.

12. If the dialed number has not bee ported, the call is routed and signaling generated in the normal manner.

The dialed number is populated in the CdPN parameter

The GAP is not used

The call is routed based upon the DN contained in the CdPN parameter.

In some cases, an end office switch may served more than one carrier, with different sets of customers, associated with different sets, telephone numbers, being served by different carriers. Under these circumstances, different trunk groups are likely to be used for the calls of the different carriers. The routing arrangement must be capable of selecting these carriers. Therefore, it is necessary to have the translation in the LUDB951 and NUBD 952 augmented with the identified of the trunk groups or a routing index for finding such trunk groups. As shown in FIG. 5, such carriers must be identified for routing and entered in billing records.

Figure 19:
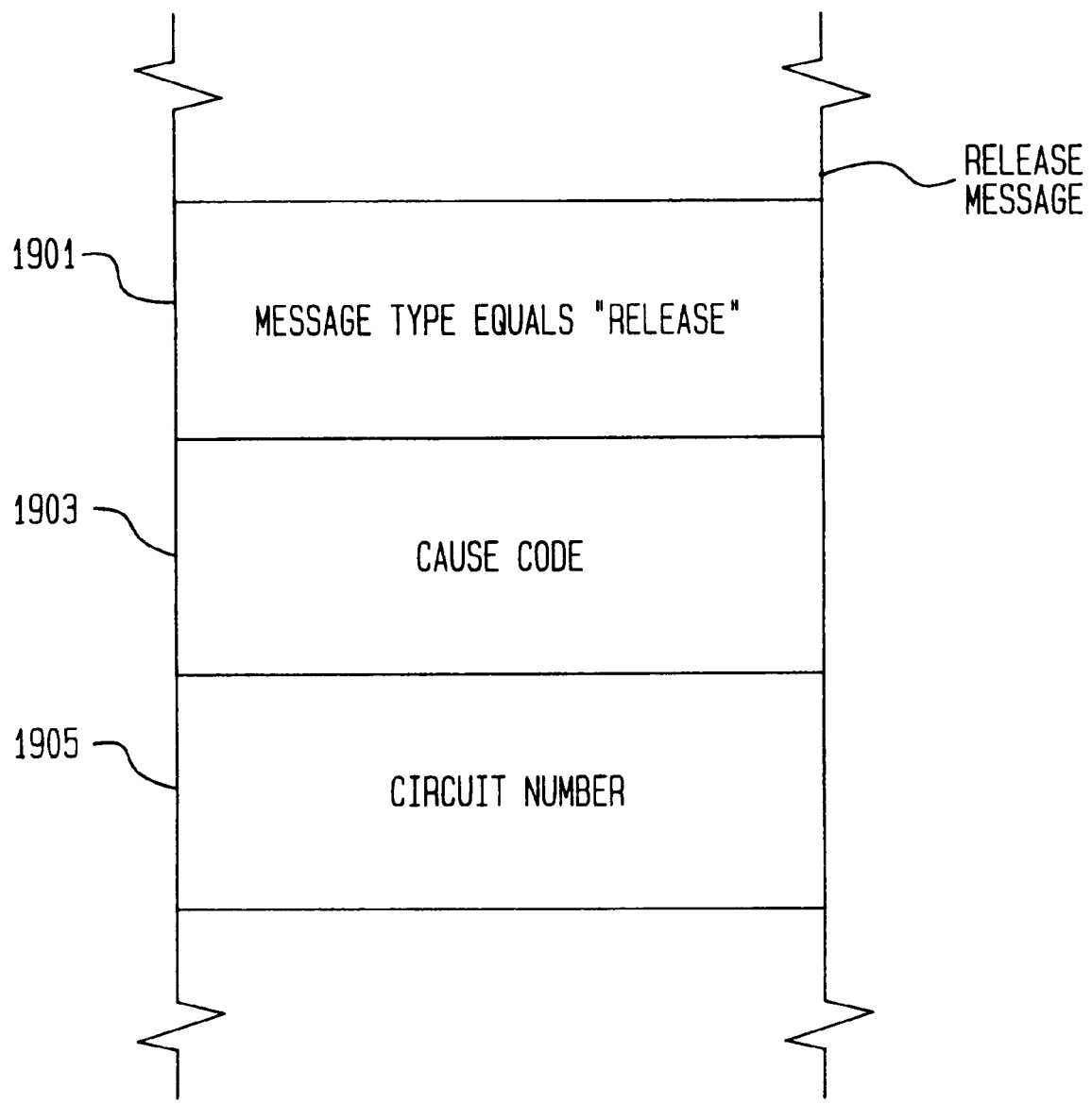
FIGS. 19–23 are flow diagrams of methods of implementing applicants' invention.

FIGS. 19–23 illustrate applicants' present invention. FIG. 19 is a diagram of a release message, a message used for any condition requiring the termination of a call by the switch sending the message. In this case, the release message is returned by an incorrectly selected terminating switch in response to an initial address message specifying that terminating switch either in the form of a location routing number, or by the directory number. The returned message is a release message as indicated in the message type field 1901 whose value is release. A circuit number (1903) is specified to allow the call to be identified, eventually by the switch which routed the call to that terminating switch. Finally, and importantly, a cause code (1905) is specified. This cause code is a code included in a release message to inform the switch that originally queried a database ("querying switch") to identify a terminating switch of the call of the reason why the call is being released.

Figure 20:
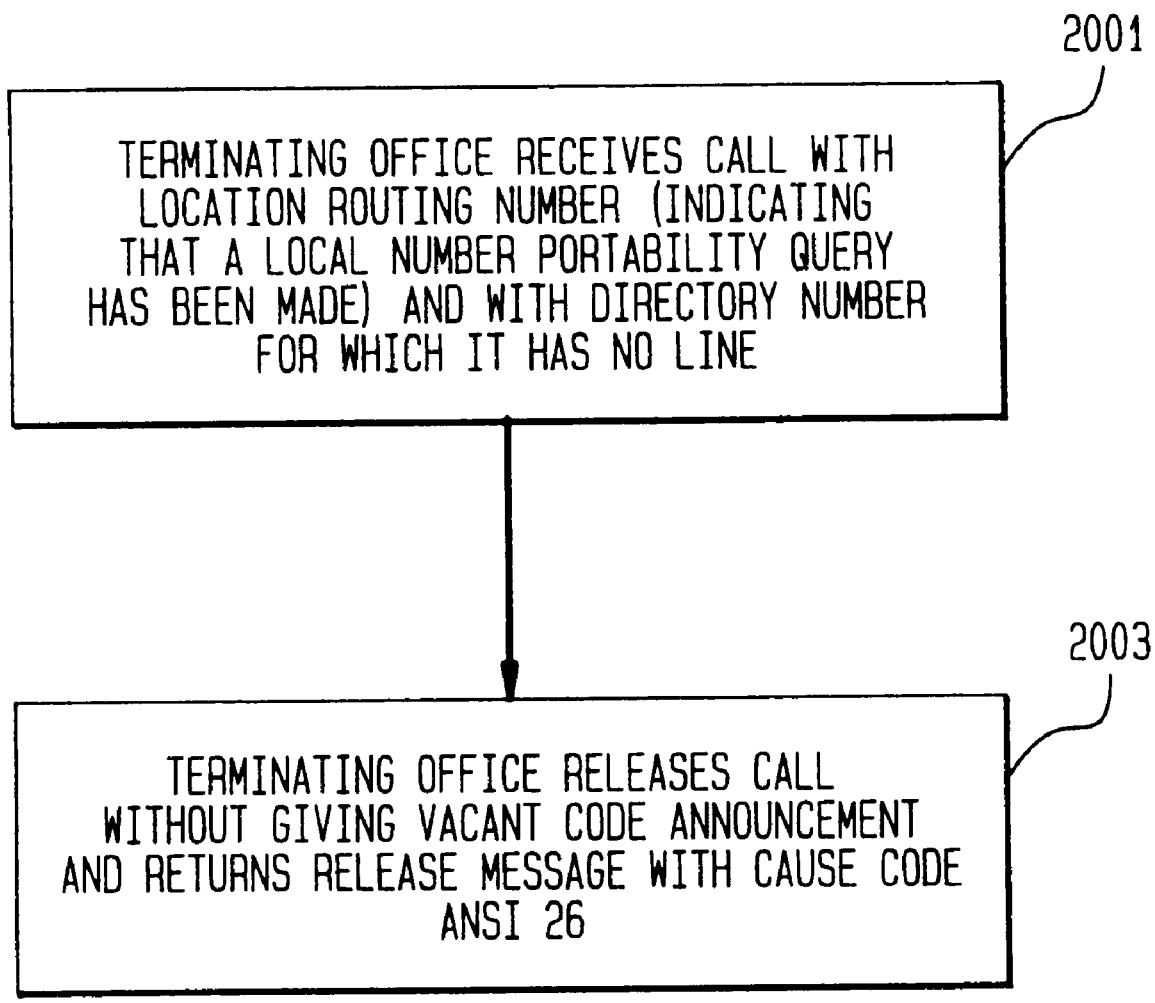

FIG. 20 is from the prior art and specified the actions taken by the intended terminating switch that receives a call with a location routing number referring to that terminating switch and an indication that a local number portability query has been made and a directory number for which that terminating switch has no corresponding line. Action block 2001 indicates the state that a query has been made. In response, the terminating office releases the call without giving a vacant code announcement and returns a release message with cause code 26 as specified in the ANSI standards (action block 2003).

Figure 21:
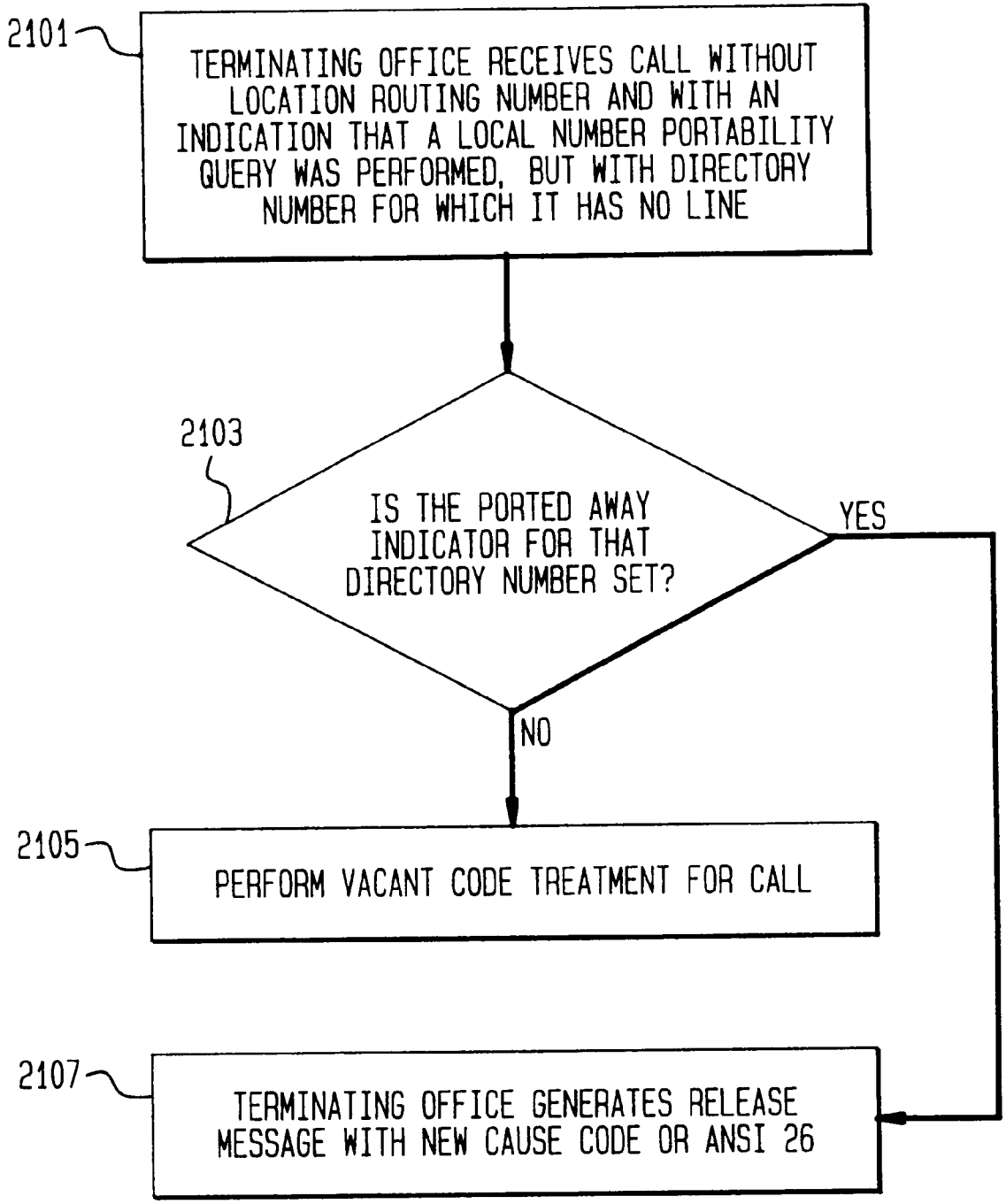

FIG. 21 indicates actions performed when an intended terminating switch receives a call with an indication that a local number portability query was performed, but receives this call without a location routing number and with a directory number for which it has no line (action block 2101). This condition can represent a vacant code or it can represent a situation wherein the line for that directory number has been ported to another switch. Test 2103 is used to check whether a ported away indicator (see FIG. 23) for the directory number has been set. If not, then normal vacant code treatment is given to the call (action block 2105). If the ported away indicator has been set, then the intended terminating office generates a release message with a cause code ANSI 26, or, if that is unacceptable to the industry (probably ANSI), a new cause code. Cause code 26 should be acceptable, since that cause code represents an error in the data provided by the local number portability database, a situation which holds in this case.

Figure 22:
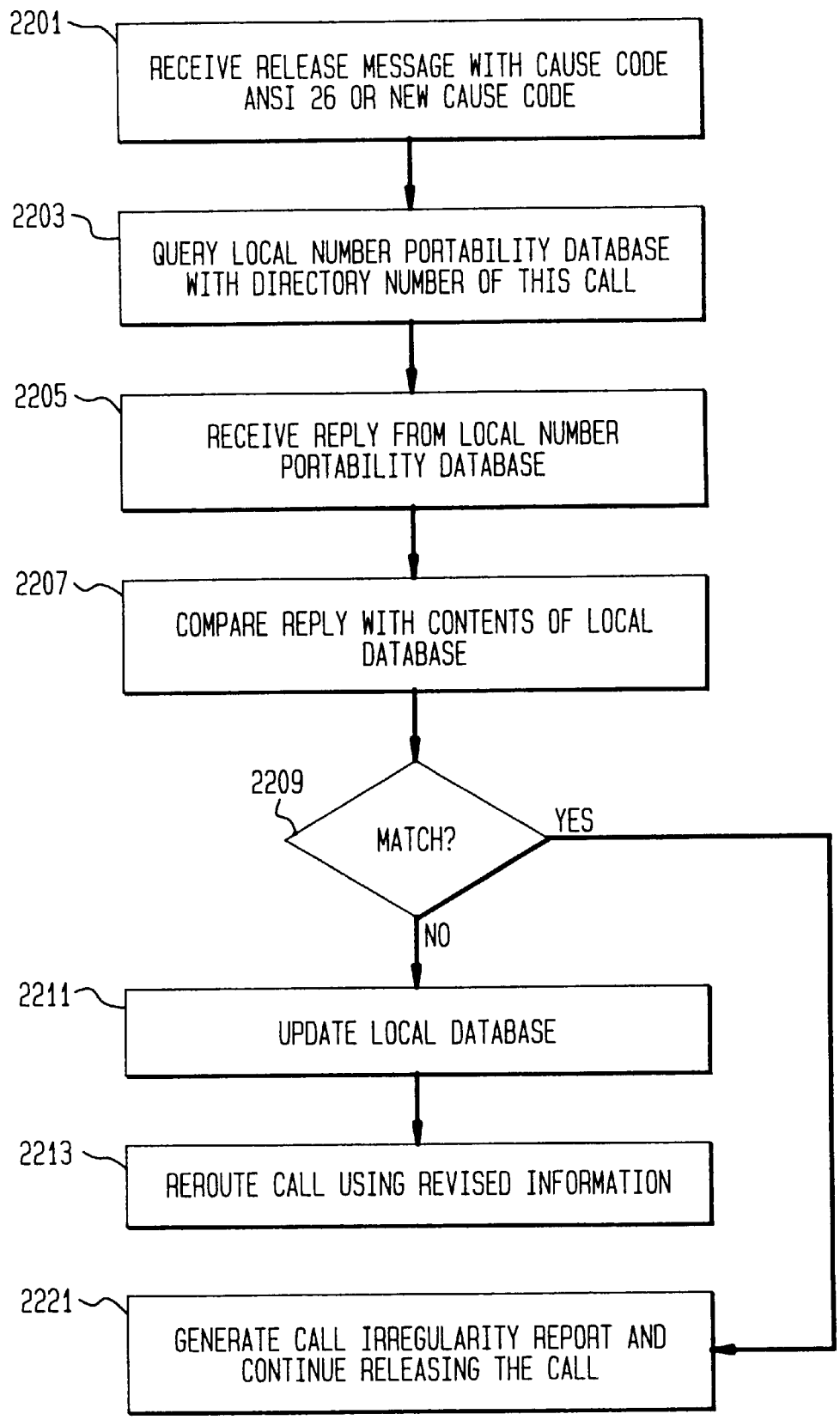

FIG. 22 is a flow diagram representing actions performed in the switch that caused the call to be routed to the terminating switch of FIGS. 20 and 21. This switch receives a release message (action block 2201) with either cause code ANSI 26 or the new cause code described with respect to FIG. 21 (action block 2103). The querying switch upon receiving the release message will then query the local number portability database using the directory number of this call (action block 2203). It will receive a reply from that database (action block 2205) and compare the results of the reply with the contents of the local database within the querying switch (action block 2207). Test 2209 is used to determine whether the reply from the local number portability database matches the information stored in the local database. If not, the local database is updated (action block 2211) and the call is re-routed using the revised information (action block 2213). If there is a match in test 2209, then a call irregularity report to identify this condition is generated (action block 2221) because there appears to be a genuine database error in the system; the call is released.

Figure 23:
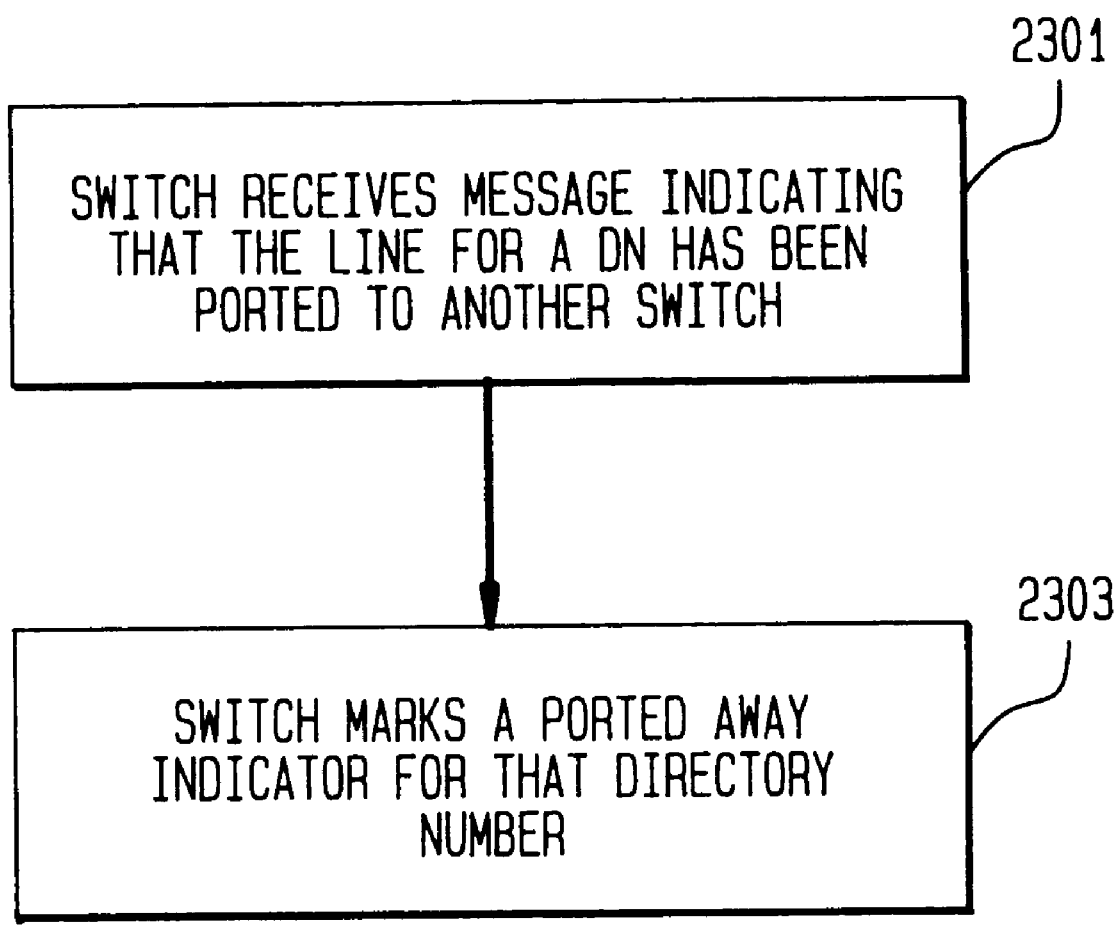

FIG. 23 illustrates the process of marking a ported away indicator, used in test 2103 (FIG. 21). A switch receives a message indicating that the line for a directory number has been ported to another switch (action block 2301). In response to receipt of that message, the switch marks a ported away indicator for that directory number (action block 2303). This indicator would be reset if the directory number subsequently became inactive.

In an alternative embodiment, at the same time that step 51 is being executed the remote database is queried. The early query saves time in case the call is not immediately routed to the correct terminating switch to anticipate the need for the query of step 2203. The result is a faster call setup time for the case in which the local database is not correct, at the expense of a large number of unnecessary queries for the case in which the local database is correct.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a telecommunications network having a centralized local number portability database, a method of processing a telephone call directed to a terminating switch which does not serve a called directory number comprising the steps of:

accessing a database within a switch for routing said call;

routing said call in accordance with data provided from said database within said switch;

responsive to detecting that said terminating switch does not serve said called directory number, generating a release message for said call, said release message having a cause code indicating that no line has been found corresponding to a directory number of said call in the switch transmitting said release message;

responsive to receiving said release message, comparing a response received from said centralized local number portability database shared by a plurality of switches with data of said database within said switch; and if the two data quantities do not match, routing the call in accordance with the data received from said centralized local number portability database and updating the database within said switch with data of said local number portability database.

2. The method of claim 1 further comprising the step of:

said database within said switch providing an LRN (Location Routing Number) for routing said call.

3. The method of claim 2 comprising the step of:

a terminating switch corresponding to said LRN generates said release message in response to determining that said terminating switch does not serve said called directory number.

4. The method of claim 3 wherein the step of generating said release message comprises the step of generating a release message with ANSI (American National Standards Institutes) cause code 26.

5. The method of claim 1 wherein a terminating switch of said call provide said release message but does not provide a vacant code announcement.

6. The method of claim 1 wherein said database within said switch does not provide an LRN (Location Routing Number), but uses said called directory number for routing said call.

7. The method of claim 6 comprising the steps of:

a terminating switch corresponding to an office code of said called directory number determines that it does not serve said called directory number;

said terminating switch testing whether a ported away indicator for said called directory number has been set; and if said ported away indicator has been set, transmitting said release message.

8. The method of claim 7 wherein said release message comprises a cause code equivalent to ANSI (American National Standards Institutes) cause code 26.

9. The method of claim 7 further comprising the steps of:

if said ported away indicator has not been set, returning a vacant code announcement.

10. The method of claim 7, further comprising the steps of:

responsive to receipt of a message indicating that service for a directory number currently served by this switch has been ported to another switch, setting a ported away indicator for said directory number.

11. The method of claim 1, wherein said release message has a first cause code if a switch generating said release message received an LRN (Location Routing Number) in a message for said call, and said release message has a second cause code, different from said first cause code, if said switch generating said release message did not receive an LRN in a message for said call.

12. The method of claim 1 further comprising the step of:

if the two data quantities match, generating a call irregularity report.

13. In a switch of a telecommunications network, a method of detecting that a querying switch has incorrect data for a called directory number, comprising the steps of:

responsive to receipt of a message for a terminating call to an attempted terminating switch, said message comprising said called directory number, testing whether said attempted terminating switch serves said called directory number;

if said switch does not serve said called directory number testing whether a ported away indicator has been set for said called directory number; and if said ported away indicator has been set, transmitting a release message comprising a cause code equivalent to ANSI (American National Standards Institute) cause code 26.

14. The method of claim 13 wherein said cause code for said message is different if said message included an LRN (Location Routing Number) than if said message did not include a LRN.

15. In a telecommunications network having a centralized local number portability database, a method of processing a telephone call directed to a terminating switch which does not serve a called directory number comprising the steps of:

accessing a database within a switch for routing said call;

routing said call in accordance with data provided from said database within said switch;

querying a centralized local number portability database shared by a plurality of switches using said directory number concurrently with routing said call;

responsive to receiving a release message for said call, said release message having a cause code indicating that no line has been found corresponding to a directory number of said call in the switch transmitting said release message, comparing a response received from said centralized local number portability database shared by a plurality of switches with data of said database within said switch; and if the two data quantities do not match, routing the call in accordance with the data received from said local number portability database and updating the database within said switch with data of said local number portability database.

16. In a telecommunications network having a centralized local number portability database, apparatus for processing a telephone call from an originating switch directed to a terminating switch which does not serve a called directory number, comprising:

processor means in said originating switch;

said processor means comprising:

a local database for said switch; and a program;

said processor means, operative under control of said program for:

routing said call in accordance with data provided from said local database;

responsive to receiving a release message for said call, said release message having a cause code indicating that no line has been found corresponding to a directory number of said call in the switch transmitting said release message, querying said centralized local number portability database shared by a plurality of switches, using said directory number;

comparing a response received from said local number portability database with data of said database within said switch; and if the two data quantities do not match, routing the call in accordance with the data received from said local number portability database and updating said local database with data of said local number portability database.

* * * * *